US012652417B2

(12) United States Patent (10) Patent No.: US 12,652,417 B2
Lu et al. (45) Date of Patent: Jun. 9, 2026

(54) TRANSMISSION OF VOLUMETRIC IMAGES IN MULTIPLANE IMAGING FORMAT

(71) Applicant: DOLBY LABORATORIES LICENSING CORPORATION

(72) Inventors: Taoran Lu, Santa Clara, CA (US); Peng Yin, Ithaca, CA (US); Guan-Ming Su, Fremont, CA (US); Dae Yeol Lee, San Jose, CA (US); Sean Thomas McCarthy, San Francisco, CA (US); Tsung-Wei Huang, Sunnyvale, CA (US); Sejin Oh, Santa Clara, CA (US); Gary J. Sullivan, Bellevue, WA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 109 days.

(21) Appl. No.: 18/671,633

(22) Filed: May 22, 2024

(65) Prior Publication Data

US 2024/0357181 A1 Oct. 24, 2024

Related U.S. Application Data

(63) Continuation-in-part of application No. PCT/US2024/024017, filed on Apr. 11, 2024.

(Continued)

(51) Int. Cl.
*H04N 19/70* (2014.01)
*H04N 19/136* (2014.01)
*H04N 19/17* (2014.01)
(52) U.S. Cl.
CPC ........... *H04N 19/70* (2014.11); *H04N 19/136* (2014.11); *H04N 19/17* (2014.11)

(58) Field of Classification Search
CPC .... H04N 19/46; H04N 19/136; H04N 19/597; H04N 19/172; H04N 19/119; H04N 19/70
See application file for complete search history.

(56) References Cited

U.S. PATENT DOCUMENTS

2022/0353486 A1 11/2022 Mccready
2023/0362409 A1* 11/2023 Chupeau ................ H04N 19/70
(Continued)

FOREIGN PATENT DOCUMENTS

WO 2021064293 A1 4/2021
WO 2022069522 A1 4/2022

OTHER PUBLICATIONS

Bhullar, Gurdeep (Interdigital) et al; "[V-PCC] [New] Fix to the semantic definition of plrd_present_flag"; 142.MPEG Meeting; Apr. 24-28, 2023; Antalya; (Motion Picture Expert Group or ISO/IEC JTC1/SC29/WG11) No. m62513; Mar. 23, 2023 (Mar. 23, 2023); XP030308498; 371 pages.
(Continued)

*Primary Examiner* — Neil R Mikeska

(57) ABSTRACT

Methods and apparatus for transmission of volumetric images in the MPI format. According to an example embodiment, texture and alpha layers of multiplane images are packed, as tiles, into a sequence of video frames. The sequence of video frames is then compressed to generate a video bitstream, which is transmitted together with a metadata bitstream specifying at least the parameters of the packing arrangement for the tiles in the sequence of video frames. Example packing arrangements include various selectable spatial and temporal arrangements for texture layers, alpha layers, and camera views. In some examples, the metadata bitstream is implemented using a SEI message and includes parameters selected from the group consisting of a size of the reference view, the number of layers in the (Continued)

multiplane image, the number of simultaneous views, one or more characteristics of the packing arrangement, layer merging information, dynamic range adjustment information, and reference view information.

13 Claims, 18 Drawing Sheets

Related U.S. Application Data

(60) Provisional application No. 63/613,374, filed on Dec. 21, 2023, provisional application No. 63/586,232, filed on Sep. 28, 2023, provisional application No. 63/510,204, filed on Jun. 26, 2023, provisional application No. 63/495,715, filed on Apr. 12, 2023.

(56) References Cited

U.S. PATENT DOCUMENTS

| | | | | |
|---|---|---|---|---|
| 2023/0379495 | A1* | 11/2023 | Fleureau | H04N 19/597 |
| 2024/0196011 | A1* | 6/2024 | Drazic | H04N 21/234327 |
| 2024/0244259 | A1* | 7/2024 | Doyen | G03H 1/08 |
| 2025/0056016 | A1* | 2/2025 | Fleureau | H04N 19/46 |

OTHER PUBLICATIONS

Fleureau, Julien et al; "MIV CE1—Related: Transparency Profile and Application to MPI Encoding"; No. m55089; Oct. 20, 2020 (Oct. 20, 2020); MPEG132 on-line; XP030292612; 31 pages.

Fleureau, Julien et al; "MIV CE1-Related—Activation of a transparency attribute and application to MPI encoding"; International Organisation for Standardisation; Organisation Internationale de Normalisation; ISO/IEC JTC 1/SC 29/WG 4; Coding of Moving Pictures and Audio; No. m55089; Oct. 6, 2020 (Oct. 6, 2020), XP030292611; 14 pages.

Garus, Patrick et al; "Decoder Side Multiplane Images using Geometry Assistance SEI for MPEG Immersive Video"; 2022 IEEE 24th International Workshop on Multimedia Signal Processing (MMSP); Shanghai, China; 2022; pp. 1-6; doi: 10.1109/MMSP55362.2022.9949559. 6 pages.

ISO/IEC 23090-12:2021(E)/AMD.1:2022. ISO/IEC JTC 1/SC 29. Information technology—Coded representation of immersive media—Part 12: MPEG Immersive video. 83 pages.

ISO/IEC JTC 1/SC 29/WG 03 N00698. MPEG Systems. WD of ISO/IEC 23090-7 AMD 1 Common Metadata for Immersive Media. Oct. 28, 2022. 36 pages.

ISO/IEC JTC 1/SC 29/WG 04 N 0232. MPEG Video Coding. Common Test Conditions for MPEG Immersive Video. Output Document. Jul. 29, 2022. 22 pages.

ITU-T H.265 (V9) (Sep. 2023) High efficiency video coding. Series H: Audiovisual and Multimedia Systems—Infrastructure of audiovisual services—Coding of moving video. 718 pages.

ITU-T H.274 (V3). Sep. 2023. Versatile supplemental enhancement information messages for coded video bitstreams. Series H: Audiovisual and Multimedia Systems—Infrastructure of audiovisual services—Coding of moving video. 130 pages.

Lu, Taoran et al; "AHG9: Multiplane Image Information SEI"; Joint Video Experts Team (JVET) of ITU-T SG 16 WP 3 and ISO/IEC JTC 1/SC 29; 31st Meeting; Geneva, CH; Jul. 11-19, 2023; Doc. No. JVET-AE0066; 15 pages.

Lu, Taoran et al; "AHG9: On the Proposed Multiplane Image Information SEI Message"; Joint Video Experts Team (JVET) of ITU-T SG 16 WP 3 and ISO/IEC JTC 1/SC 29; 32nd Meeting; Hannover, DE; Oct. 13-20, 2023; Doc. No. JVET-AF0167; 18 pages.

Mildenhall, Ben et al; "Local Light Field Fusion: Practical View Synthesis with Prescriptive Sampling Guidelines"; 2019; ACM Trans. Graph. 38; 4; Article 29 (Aug. 2019); 14 pages.

Tucker, Richard et al; "Single-View View Synthesis with Multiplane Images"; Google Research; Apr. 23, 2020; 10 pages.

WD 4 of ISO/IEC 23090-12 MPEG Immersive Video 2nd edition, Feb. 9, 2024, 113 pages.

* cited by examiner

TABLE: CONSTRAINTS OF HEVC LEVEL 5.x AND 6.x

| LEVEL | MAX LUMA SAMPLE RATE (SAMPLES/S) | MAX LUMA PICTURE SIZE (SAMPLES) | MAX BIT RATE FOR MAIN AND MAIN 10 PROFILES (1000BIT/S) | | EXAMPLE PICTURE RESOLUTION AT HIGHEST FRAME RATE (MAXDpbSIZE) | MAX NUMBER OF TILE | |
|---|---|---|---|---|---|---|---|
| | | | MAIN TIER | HIGH TIER | | ROWS | COLUMNS |
| 5 | 267,386,880 | | 25 | 100 | 1,920×1,080 AT 128.0 (16)<br>2,048×1,080 AT 120.0 (16)<br>3,840×2,160 AT 32.0 (6)<br>4,096×2,160 AT 30.0 (6) | | |
| 5.1 | 534,773,760 | 8,912,896 | 40 | 160 | 1,920×1,080 AT 256.0 (16)<br>2,048×1,080 AT 240.0 (16)<br>3,840×2,160 AT 64.0 (6)<br>4,096×2,160 AT 60.0 (6) | 11 | 10 |
| 5.2 | 1,069,547,520 | | 60 | 240 | 1,920×1,080 AT 300.0 (16)<br>2,048×1,080 AT 300.0 (16)<br>3,840×2,160 AT 128.0 (6)<br>4,096×2,160 AT 120.0 (6) | | |
| 6 | 1,069,547,520 | | 60 | 240 | 3,840×2,160 AT 128.0 (16)<br>4,096×2,160 AT 120.0 (16)<br>7,680×4,320 AT 32.0 (6)<br>8,192×4,320 AT 30.0 (6) | | |
| 6.1 | 2,139,095,040 | 35,651,584 | 120 | 480 | 3,840×2,160 AT 256.0 (16)<br>4,096×2,160 AT 240.0 (16)<br>7,680×4,320 AT 64.0 (6)<br>8,192×4,320 AT 60.0 (6) | 22 | 20 |
| 6.2 | 4,278,190,080 | | 240 | 800 | 3,840×2,160 AT 300.0 (16)<br>4,096×2,160 AT 300.0 (16)<br>7,680×4,320 AT 128.0 (6)<br>8,192×4,320 AT 120.0 (6) | | |

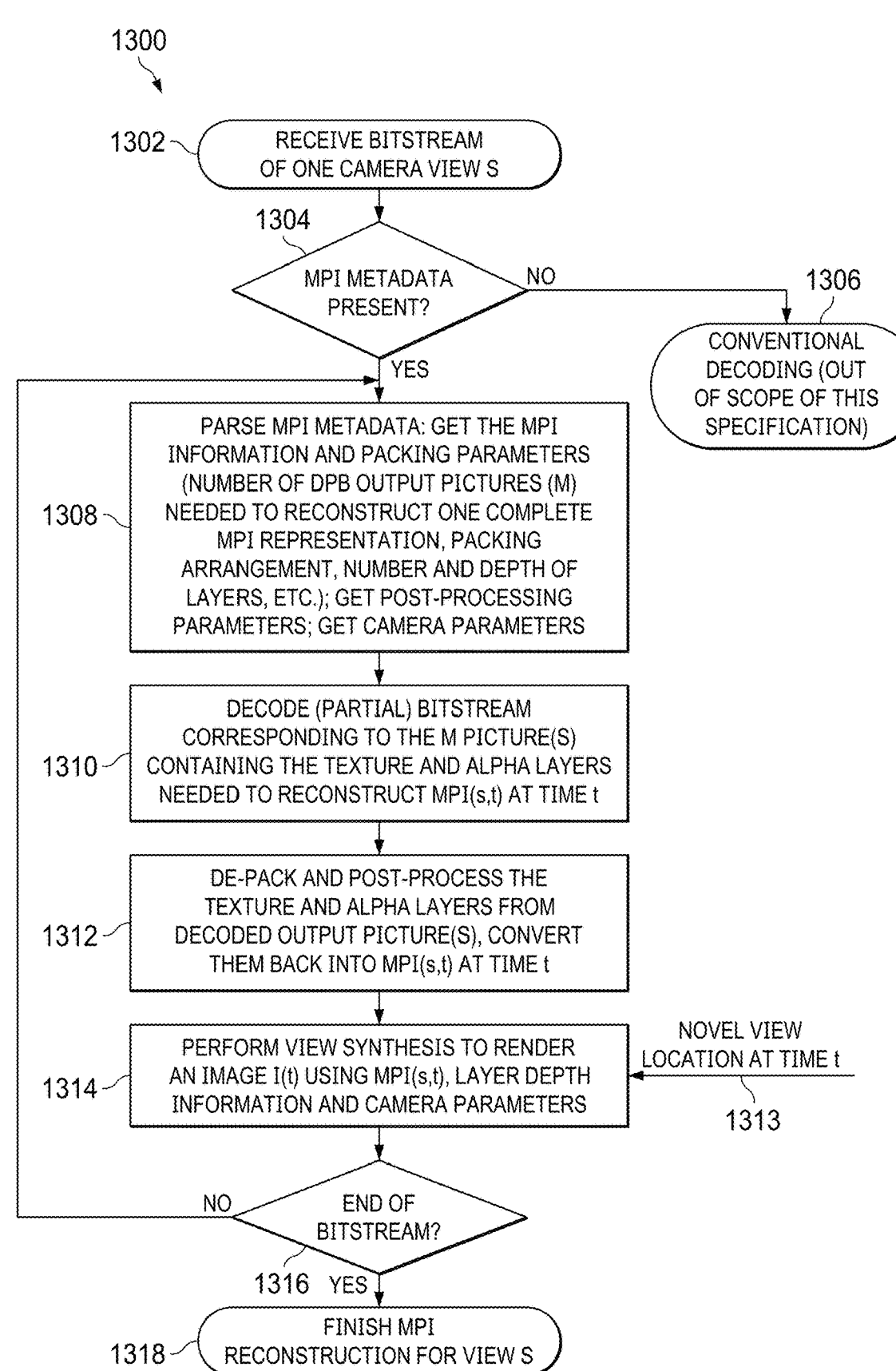

1302 — RECEIVE BITSTREAM OF ONE CAMERA VIEW S

1304

MPI METADATA PRESENT?

NO → 1306 CONVENTIONAL DECODING (OUT OF SCOPE OF THIS SPECIFICATION)

YES

1308 — PARSE MPI METADATA: GET THE MPI INFORMATION AND PACKING PARAMETERS (NUMBER OF DPB OUTPUT PICTURES (M) NEEDED TO RECONSTRUCT ONE COMPLETE MPI REPRESENTATION, PACKING ARRANGEMENT, NUMBER AND DEPTH OF LAYERS, ETC.); GET POST-PROCESSING PARAMETERS; GET CAMERA PARAMETERS

1310 — DECODE (PARTIAL) BITSTREAM CORRESPONDING TO THE M PICTURE(S) CONTAINING THE TEXTURE AND ALPHA LAYERS NEEDED TO RECONSTRUCT MPI(s,t) AT TIME t

1312 — DE-PACK AND POST-PROCESS THE TEXTURE AND ALPHA LAYERS FROM DECODED OUTPUT PICTURE(S), CONVERT THEM BACK INTO MPI(s,t) AT TIME t

1314 — PERFORM VIEW SYNTHESIS TO RENDER AN IMAGE I(t) USING MPI(s,t), LAYER DEPTH INFORMATION AND CAMERA PARAMETERS

NOVEL VIEW LOCATION AT TIME t

1313

END OF BITSTREAM?

NO

1316    YES

1318 — FINISH MPI RECONSTRUCTION FOR VIEW S

| MPI_info(payloadSize){ | DESCRIPTOR |
|---|---|
| /*MPI information: original resolution without padding, depth*/ | |
| mpi_is_one_view_among_multiple_flag | u(1) |
| if(mpi_is_one_view_among_multiple == 1) | |
|   mpi_view_id/*the unique view id in a multiple view scenario*/ | ue(v) |
| camera_related_metadata_for_current_view()/*we can use MAI SEI in VSEI*/ | |
| /*specify original size of MPI layer, alternatively way is to specify crop window offsets*/ | |
| mpi_layer_width_in_luma_samples/*specify original MPI size*/ | ue(v) |
| mpi_layer_height_in_luma_samples/*specify original MPI size*/ | ue(v) |
| mpi_log2_ctu_size_minus5/*32 or 64, for padding purpose, padding on bottom/right*/ | ue(v) |
| mpi_bit_depth_texture_minus8 | ue(v) |
| mpi_bit_depth_alpha_minus4/*minimal bitdepth is 4*/ | ue(v) |
| /*MPI layer information: layer, region, region based depth information*/ | |
| mpi_num_layers_minus1 | ue(v) |
| mpi_num_regions_minus1/*each region may have different closest and farthest depth*/ | ue(v) |
| if(mpi_num_regions_minus1>0) { | |
|   num_region_rows_minus1/*assume equal space region, so last row/column region can be smaller*/ | ue(v) |
|   num_region_cols_minus1 | |
| } | |
| for(i=0; i<=mpi_num_regions_minus1; i++) { | |
|   /*specify depth info. for each region and each layer*/ | |
|   mpi_depth_equal distance_flag[i] | u(1) |
|   if(mpi_depth_equal_distance_flag[i]) | |
|     depth_rep_info_element(ZNearSign[i], ZNearExp[i], ZNearMantissa[i], ZNearManLen[i])/*specify nearest | |
| | |

TO FIG. 14B

FROM FIG. 14A

| | |
|---|---|
|    depth_rep_info_element(ZFarSign[i], ZFarExp[i], ZFarMantissa[i], ZFarManLen[i]) | |
|   } else | |
|   for(j=0; j<=mpi_num_layer_minus1; j++) | |
|    depth_rep_info_element(depthSign[i][j], depthExp[i][j], depthMantissa[i][j], depthManLen[i][j]) | |
|   mpi_alpha_mapping_flag[i] | u(1) |
|   if(mpi_alpha_mapping_flag[i]) {/*mpi reshaping*/ | |
|   alpha_quant_precision_minus11[i]/*precision used to quantize max alpha values*/ | ue(v) |
|   for(j = 0; j <= mpi_num_layer_minus1; j++) | |
|   max_alpha[i][j] | u(v) |
|   } | |
|  } | |
| mpi_texture_layer_merge_flag | u(1) |
| if(mpi_texture_layer_merge_flag) { | |
|   log2_mpi_num_layers_in_one_merged_texture_layer_minus1/*number of layers in one merged texture layers*/ | ue(v) |
|   NumAlphaLayersInOneMergedTextureLayer = 2^(log2_mpi_num_layers_in_one_merged_texture_layer_minus1+1) NumMergedTextureLayers = (mpi_num_layers_minus1+1)/(NumAlphaLayersInOneMergedTextureLayer) | |
|   for(i = 0; i <= NumMergedTextureLayers - 1; i++/*the last merge layers corresponding left layers, so need to signal*/ | |
|   /*corresponding depth alpha layer id*/ | |
|   for(j=0; j < NumAlphaLayersInOneMergedTextureLayer; j++) | |
|   mpi_layer_id_in_one_merged_texture_layer[i][j] | u(v) |
|   } | |
|  } | |

| MPI_packing_info(payloadSize){ | DESCRIPTOR |
|---|---|
| mpi_arrangement_type /*0: texture and alpha spatial packing (option 0), 1: texture alpha temporal interleaving (option 3)*/ | ue(v) |
| if (mpi_arrangement_type==0){ | |
| mpi_alpha_scale_factor_x_minus1/*scale down alpha map layers*/ | ue(v) |
| mpi_alpha_scale_factor_y_minus1/*scale down alpha map layers*/ | ue(v) |
| mpi_spatial_arrangement_type/*0: ToB; 1:SbS*/ | ue(v) |
| mpi_num_texture_layers_in_height_minus1/*no need to signal mpi_num_txture_layers_in_width = (NumMergedTextureLayers)/(mpi_num_layers_in_height_minus1+1)*/ | ue(v) |
| mpi_num_alpha_layers_in_height_minus1/*no need to signal mpi_num_alpha_layers_in_width = (mpi_num_layers_minus1+1)/(mpi_num_layers_in_height_minus1+1)*/ | ue(v) |
| } else { | |
| mpi_num_layers_in_height_minus1 */texture and alpha has the same packing. mpi_num_cols=(mpi_num_layers_minus1+1)/(mpi_num_layers_in_height_minus1+1)*/ | ue(v) |
| } | |
| } | |

| multiplane_image_information (payloadSize) { | DESCRIPTOR |
|---|---|
|   mpi_cancel_flag | u(1) |
|  if (mpi_cancel_flag){ | |
|   mpi_persistence_flag | u(1) |
|   mpi_view_id | ue(v) |
|   mpi_num_layers_minus1 | ue(v) |
|   mpi_layer_depth_equal_distance_flag | u(1) |
|   if (mpi_layer_depth_equal_distance_flag) { | |
|     depth_rep_info_element (ZNearSign, ZNearExp, ZNearMantissa, ZNearManLen) | |
|     depth_rep_info_element (ZFarSign, ZFarExp, ZFarMantissa, ZFarManLen) | |
|   } else { | |
|     for (i=0; i≤mpi_num_layer_minus1; j++) | |
|      depth_rep_info_element (ZSign[i], ZExp[i], ZMantissa[i], ZManLen[i]) | |
|   } | |
|   mpi_texture_opacity_interleave flag | u(1) |
|   if (mpi_texture_opacity_interleave flag == 0) { | |
|     mpi_texture_opacity_arrangement_flag/*0: TaB, 1:SbS*/ | u(1) |
|   } | |
|   mpi_frame_num_layers_minus1_in_height | ue(v) |
|   mpi_layer_crop_window_flag | u(1) |
|   if (mpi_layer_crop_window_flag) { | |
|     mpi_layer_crop_win_left_offset | ue(v) |
|     mpi_layer_crop_win_right_offset | ue(v) |
|     mpi_layer_crop_win_top_offset | ue(v) |
|     mpi_layer_crop_win_bottom_offset | ue(v) |
|   } | |
|  } | |
| } | |

FIG. 16

TRANSMISSION OF VOLUMETRIC IMAGES IN MULTIPLANE IMAGING FORMAT

1. CROSS-REFERENCE TO RELATED APPLICATIONS

The present application is a continuation-in-part (CIP) Patent Application of PCT Application Ser. No. PCT/US2024/24017, filed on Apr. 11, 2024, which claims the benefit of priority to U.S. Provisional Patent Applications Nos. 63/495,715 filed on 12 Apr. 2023, 63/510,204, filed on 26 Jun. 2023, 63/586,232, filed on 28 Sep. 2023, and 63/613,374, filed 21 Dec. 2023, all of which are incorporated herein by reference in their entirety.

2. FIELD OF THE DISCLOSURE

Various example embodiments relate generally to multiplane imaging (MPI) and, more specifically but not exclusively, to transmission of multiplane images.

3. Background

Multiplane images embody a relatively new approach to storing volumetric content. MPI can be used to render both still images and video and represents a three-dimensional (3D) scene within a view frustum using, e.g., 8, 16, or 32 planes of texture and transparency (alpha) information per camera. Example applications of MPI include computer vision and graphics, image editing, photo animation, robotics, and virtual reality.

BRIEF SUMMARY OF SOME SPECIFIC EMBODIMENTS

Disclosed herein are various embodiments of methods and apparatus for transmission of volumetric images in the MPI format. According to an example embodiment, texture and alpha layers of a video sequence of multiplane images are packed, as tiles, into a sequence of two-dimensional (2D) video frames. The sequence of 2D video frames is then compressed to generate a video bitstream, which is transmitted together with a metadata bitstream specifying the pertinent MPI parameters, e.g., parameters specifying the packing arrangement for the tiles in the sequence of 2D video frames. Selectable packing arrangements include but are not limited to (i) spatially packed texture and alpha layers with temporally packed views, (ii) spatially packed views with temporally packed texture and alpha layers, and (iii) spatially packed texture layers and spatially packed alpha layers temporally interleaved with temporally packed views. In some examples, the metadata bitstream includes parameters selected from the group consisting of sizes of reference views, numbers of layers in the multiplane images, numbers of simultaneous views, characteristics of the packing arrangement, layer merging information, dynamic range adjustment information, and reference view information. In some examples, the metadata bitstream includes one or more supplemental enhancement information (SEI) messages.

According to an example embodiment, provided is an apparatus for encoding a sequence of multiplane images, the apparatus comprising: at least one processor; and at least one memory including program code, wherein the at least one memory and the program code are configured to, with the at least one processor, cause the apparatus at least to: generate a sequence of video frames, each of the video frames including a respective plurality of tiles representing layers of respective one or more of the multiplane images; generate a metadata bitstream to specify at least a packing arrangement of the tiles in the sequence of video frames; generate a video bitstream by applying video compression to the sequence of video frames; and multiplex the video bitstream and the metadata bitstream for transmission.

According to another example embodiment, provided is a method for encoding a sequence of multiplane images, the method comprising: generating a sequence of video frames, each of the video frames including a respective plurality of tiles representing layers of one or more of the multiplane images; generating a metadata bitstream to specify at least a packing arrangement of the tiles in the sequence of video frames; generating a video bitstream by applying video compression to the sequence of video frames; and multiplexing the video bitstream and the metadata bitstream for transmission.

According to yet another example embodiment, provided is an apparatus for decoding a received bitstream having encoded therein a sequence of multiplane images, the apparatus comprising: at least one processor; and at least one memory including program code, wherein the at least one memory and the program code are configured to, with the at least one processor, cause the apparatus at least to: demultiplex the received bitstream to obtain a video bitstream having encoded therein a sequence of video frames and to obtain a metadata bitstream specifying at least a packing arrangement of tiles in the sequence of video frames, the tiles representing layers of the multiplane images; reconstruct the sequence of video frames by applying video decompression to the video bitstream; and reconstruct the sequence of multiplane images using the tiles from the sequence of video frames and based on the metadata bitstream.

According to yet another example embodiment, provided is a method for decoding a received bitstream having encoded therein a sequence of multiplane images, the method comprising: demultiplexing the received bitstream to obtain a video bitstream having encoded therein a sequence of video frames and to obtain a metadata bitstream specifying at least a packing arrangement of tiles in the sequence of video frames, the tiles representing layers of the multiplane images; reconstructing the sequence of video frames by applying video decompression to the video bitstream; and reconstructing the sequence of multiplane images using the tiles from the sequence of video frames and based on the metadata bitstream.

For some embodiments of the above methods, provided is a non-transitory computer-readable medium storing instructions that, when executed by at least one processor, cause the at least one processor to perform operations comprising the corresponding one of the above methods.

BRIEF DESCRIPTION OF THE DRAWINGS

Other aspects, features, and benefits of various disclosed embodiments will become more fully apparent, by way of example, from the following detailed description and the accompanying drawings, in which:

FIG. 7 is a table illustrating certain constraints imposed on the design and cross-compatibility of the MPI encoder of FIG. 5 and the MPI decoder of FIG. 6 according to some examples.

FIG. 13 is a flowchart illustrating an MPI decoding method according to an embodiment.

FIGS. 14A-14B show an example syntax of a SEI message configured to convey MPI metadata according to some examples.

FIG. 15 shows an example syntax of a SEI message configured to convey MPI metadata according to some other examples.

FIG. 16 shows an example syntax of a SEI message configured to convey MPI metadata according to additional examples.

DETAILED DESCRIPTION

This disclosure and aspects thereof can be embodied in various forms, including hardware, devices or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing is intended solely to give a general idea of various aspects of the present disclosure and does not limit the scope of the disclosure in any way.

In the following description, numerous details are set forth, such as device configurations, timings, operations, and the like, in order to provide an understanding of one or more aspects of the present disclosure. It will be readily apparent to one skilled in the art that these specific details are merely exemplary and not intended to limit the scope of this application.

Example Video/Image Delivery Pipeline

Figure 1:
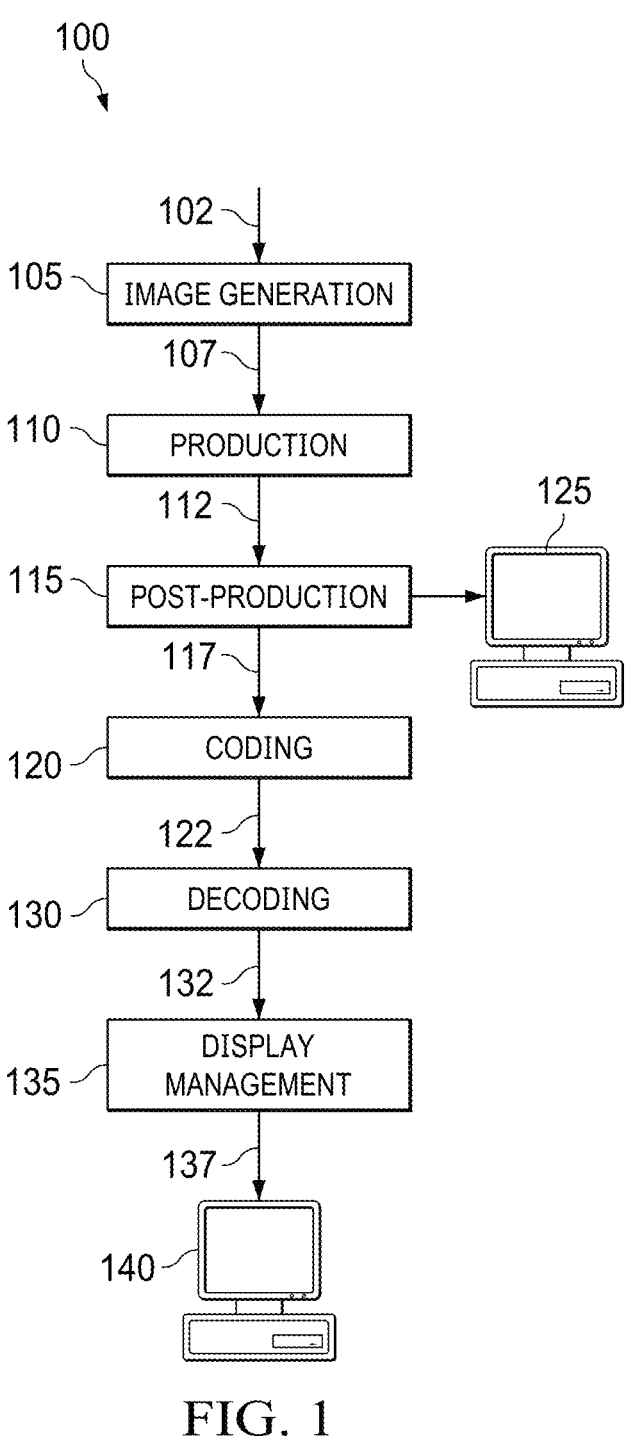
FIG. 1 depicts an example process for a video/image delivery pipeline.

FIG. 1 depicts an example process of a video delivery pipeline (100), showing various stages from video/image capture to video/image-content display according to an embodiment. A sequence of video/image frames (102) may be captured or generated using an image-generation block (105). The frames (102) may be digitally captured (e.g., by a digital camera) or generated by a computer (e.g., using computer animation) to provide video and/or image data (107). Alternatively, the frames (102) may be captured on film by a film camera. Then, the film may be translated into a digital format to provide the video/image data (107). In some examples, the image-generation block (105) includes generating an MPI image or video.

In a production phase (110), the data (107) may be edited to provide a video/image production stream (112). The data of the video/image production stream (112) may be provided to a processor (or one or more processors, such as a central processing unit, CPU) at a post-production block (115) for post-production editing. The post-production editing of the block (115) may include, e.g., adjusting or modifying colors or brightness in particular areas of an image to enhance the image quality or achieve a particular appearance for the image in accordance with the video creator's creative intent. This part of post-production editing is sometimes referred to as "color timing" or "color grading." Other editing (e.g., scene selection and sequencing, image cropping, addition of computer-generated visual special effects, removal of artifacts, etc.) may be performed at the block (115) to yield a "final" version (117) of the production for distribution. In some examples, operations performed at the block (115) include enhancing texture and/or alpha channels in multiplane images/video. During the post-production editing (115), video and/or images may be viewed on a reference display (125).

Following the post-production (115), the data of the final version (117) may be delivered to a coding block (120) for being further delivered downstream to decoding and playback devices, such as television sets, set-top boxes, movie theaters, and the like. In some embodiments, the coding block (120) may include audio and video encoders, such as those defined by the ATSC, DVB, DVD, Blu-Ray, and other delivery formats, to generate a coded bitstream (122). In a receiver, the coded bitstream (122) is decoded by a decoding unit (130) to generate a corresponding decoded signal (132) representing a copy or a close approximation of the signal (117). The receiver may be attached to a target display (140) that may have somewhat or completely different characteristics than the reference display (125). In such cases, a display management (DM) block (135) may be used to map the decoded signal (132) to the characteristics of the target display (140) by generating a display-mapped signal (137). Depending on the embodiment, the decoding unit (130) and display management block (135) may include individual processors or may be based on a single integrated processing unit.

A codec used in the coding block (120) and/or the decoding block (130) enables video/image data processing and compression/decompression. The compression is used in the coding block (120) to make the corresponding file(s) or stream(s) smaller. The decoding process carried out by the decoding block (130) typically includes decompressing the received video/image data file(s) or streams(s) into a form usable for playback and/or further editing. Example coding/decoding operations that can be used in the coding block (120) and the decoding unit (130) according to various embodiments are described in more details below.

Multiplane Imaging

A multiplane image comprises multiple image planes, with each of the image planes being a "snapshot" of the 3D scene at a certain depth with respect to the camera position. Information stored in each plane includes the texture information (e.g., represented by the R, G, B values) and transparency information (e.g., represented by the alpha (A) values). Herein, the acronyms R, G, B stand for red, green, and blue, respectively. In some examples, the three texture components can o be (Y, Cb, Cr), or (I, Ct, Cp), or another functionally similar set of values. There are different ways in which a multiplane image can be generated. For example, two or more input images from two or more cameras located at different known viewpoints can be co-processed to generate a corresponding multiplane image. Alternatively, single-view synthesis of a multiplane image can be performed using a source image captured by a single camera.

Figure 2:
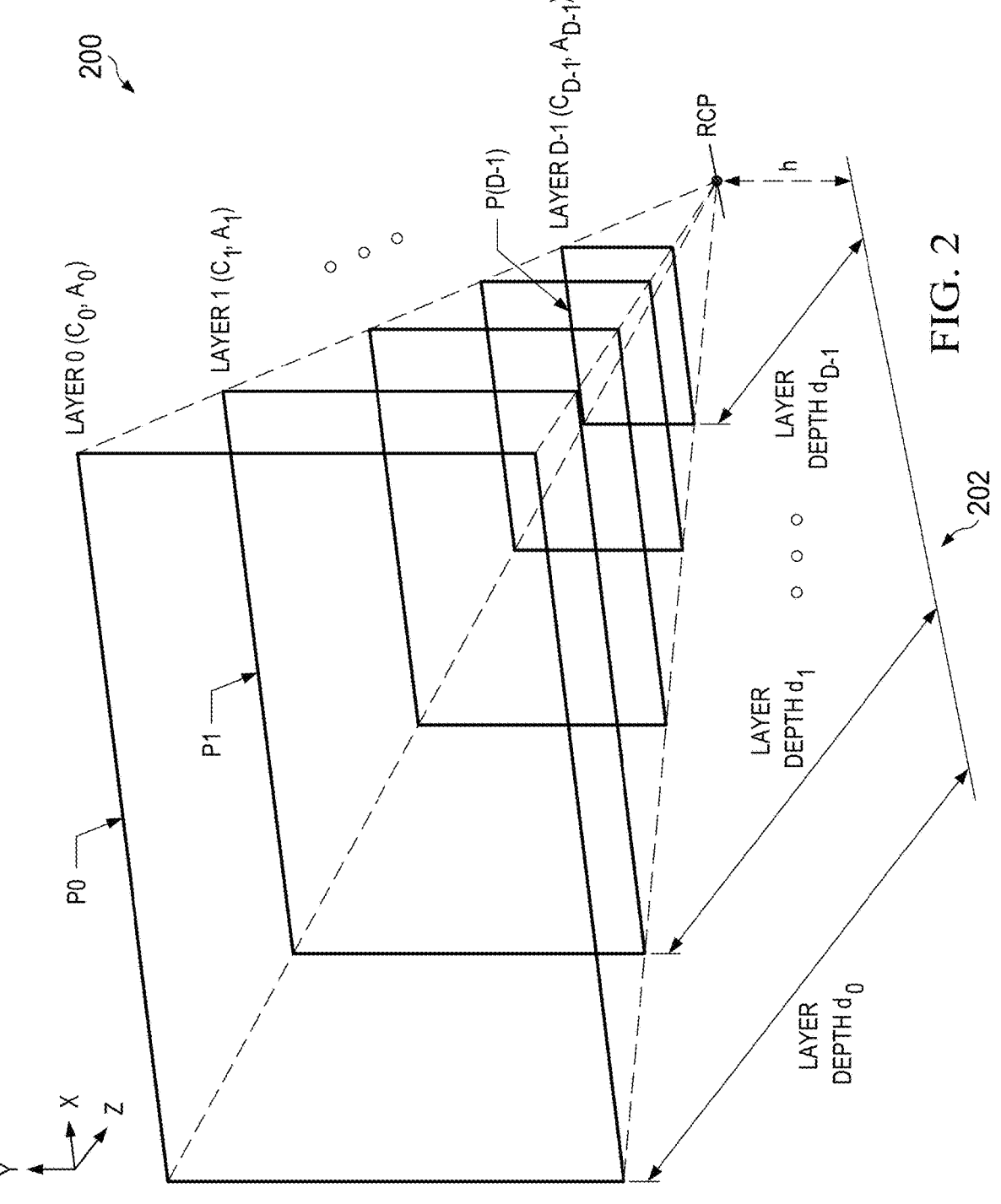
FIG. 2 pictorially illustrates a 3D-scene representation using a multiplane image according to an embodiment.

FIG. 2 pictorially illustrates a 3D scene representation using a multiplane image (200) according to an embodiment. The multiplane image (200) has D planes or layers (P0, P1, . . . , P(D–1)), where D is an integer greater than one. Typically, the planes (layers) are indexed such that the most remote layer, from the reference camera position (RCP), is indexed as the 0-th layer and is at a distance (or depth) $d_0$ from the RCP along the Z dimension of the 3D scene. The index is incremented by one for each next layer located closer to the RCP. The plane (layer) that is the closest to the RCP has the index value (D–1) and is at a distance (or depth) $d_{D-1}$ from the RCP along the Z dimension. Each of the planes (P0, P1, . . . , P(D–1)) is orthogonal to a base plane (202) which is parallel to the XZ-coordinate plane. The RCP is at a vertical height h above the base plane (202). The XYZ triad shown in FIG. 2 indicates the general orientation of the multiplane image (200) and the planes (P0, P1, . . . , P(D–1)) with respect to the X, Y, and Z dimensions of the 3D scene. In various examples, the number D can be 32, 16, 8, or any other suitable integer greater than one.

Let us denote the color component (e.g., RGB) value for the $i^{th}$ layer at camera location s as $$C_i^{(s)}$$

with the lateral size of the layer being H×W, where H is the height (Y dimension) and W is the width (X dimension) of the layer. The pixel value at location (x, y) for the color channel c is represented as $$C_i^{(s)}(x, y, c).$$

The $\alpha$ value for the $i^{th}$ layer is $$A_i^{(s)}.$$

The pixel value (x, y) in the alpha layer is represented as $$A_i^{(s)}(x, y).$$

The depth distance between the $i^{th}$ layer to the reference camera position is $d_i$. The image from the original reference view (without the camera moving) is denoted as R, with the texture pixel value being $$R^{(s)}(x, y, c).$$

A still MPI image for the camera location s can therefore be represented as:

$$MPI(s) = \{C_i^{(s)}(x, y, c), A_i^{(s)}(x, y)\}, i = 0, \ldots, D - 1 \tag{1}$$

It is straightforward to extend this still MPI image representation to a video representation, provided that that the camera position s is kept static overtime. This video representation is given by Eq. (2):

$$MPI(s, t) = \{C_i^{(s)}(x, y, c, t), A_i^{(s)}(x, y, t)\}, i = 0, \ldots, D - 1 \tag{2}$$

where t denotes time.

As already indicated above, a multiplane image, such as the multiplane image (200), can be generated using single-view synthesis from a single source image R or using multiple-view synthesis from two or more source images. Such syntheses may be performed, e.g., during the production phase (110). The corresponding MPI synthesis algorithm(s) may typically output the multiplane image (200) containing XYZ-resolved pixel values in the form $\{(C_i, A_i)$ for i=0, . . . , D–1}.

By processing the multiplane image (200) represented by $\{(C_i, A_i)$ for i=0, . . . , D–1}, an MPI-rendering algorithm can generate a viewable image corresponding to the RCP or to a new virtual camera position that is different from the RCP. An example MPI-rendering algorithm (often referred to as the "MPI viewer") that can be used for this purpose may include the steps of warping and compositing. Other suitable MPI viewers may also be used. The rendered multiplane image (200) can be viewed, e.g., on the reference display (125).

During the warping step of the MPI-rendering algorithm, each layer $(C_i, A_i)$ of the multiplane image (200) may be warped from the RCP viewpoint position $(v_s)$ to a new viewpoint position $(v_t)$, e.g., as follows:

$$C_i^t = T_{v_s, v_t}(\sigma d_i, C_i) \tag{3}$$

$$A_i^t = T_{v_s, v_t}(\sigma d_i, A_i) \tag{4}$$

where $T_{v_s, v_t}(\ )$ is the warping function; and $\sigma$ is the consistent scale (to minimize error). In an example embodiment, the warping function $T_{v_s, v_t}(\ )$ can be expressed as follows:

$$\begin{bmatrix} u_s \\ v_s \\ 1 \end{bmatrix} = K_s\left(R - \frac{tn^T}{a}\right)(K_t)^{-1}\begin{bmatrix} u_t \\ v_t \\ 1 \end{bmatrix} \tag{5}$$

where $v_s=(u_s, v_s)$ and $v_t=(u_t, v_t)$. Through (5), each pixel location $(u_t, v_t)$ on the target view of a certain MPI plane can be mapped to its respective pixel location $(u_s, v_s)$ on the source view. The functions $K_s$ and $K_t$ represent the intrinsic camera model for the reference view and the target view, respectively. The functions R and t represent the extrinsic camera model for rotation and translation, respectively. n denotes the normal vector $[0\ 0\ 1]^T$. a denotes the distance to a plane that is fronto-parallel to the source camera at depth $\sigma d_i$.

7

During the compositing step of the MPI-rendering algorithm, a new viewable image $C^t$ can be generated, e.g., using processing operations corresponding to the following equations:

$$C^t = \sum_{i=0}^{D-1} C_i^t W_i^t \qquad (6)$$

where the weights $$W_i^t$$

are expressed as:

$$W_i^t = \left(A_i^t \cdot \prod_{j=i+1}^{D-1}\left(1 - A_j^t\right)\right) \qquad (7)$$

The disparity map $D^s$ corresponding to the source view can be computed as:

$$D^s = \sum_{i=0}^{D-1} d_i^{-1} W_i^s \qquad (8)$$

where the weights $$W_i^s$$

are expressed as:

$$W_i^s = A_i \cdot \prod_{j=i+1}^{D-1}(1 - A_j)) \qquad (9)$$

The MPI-rendering algorithm can also be used to generate the viewable image $C^s$ corresponding to the RCP. In this case, the warping step is omitted, and the image $C^s$ is computed as:

$$C^s = \sum_{i=0}^{D-1} C_i^s W_i^s \qquad (10)$$

In the single camera transmission scenario, only one MPI is fed through a bitstream. A goal for this situation is to optimally merge the layers of the original MPI such that the quality of this MPI after local warping is preserved. In the multiple camera transmission scenario, multiple MPIs captured in different camera positions are encoded in the compressed bitstream. The information in these MPIs is jointly used to generate global novel views for positions located between the original camera positions. There also can be a scenario where information from multiple cameras can be used jointly to generate a single MPI to be transmitted. For transmissions of MPI video, the multiple camera transmission scenario is typically used, e.g., as explained below.

Figure 3:
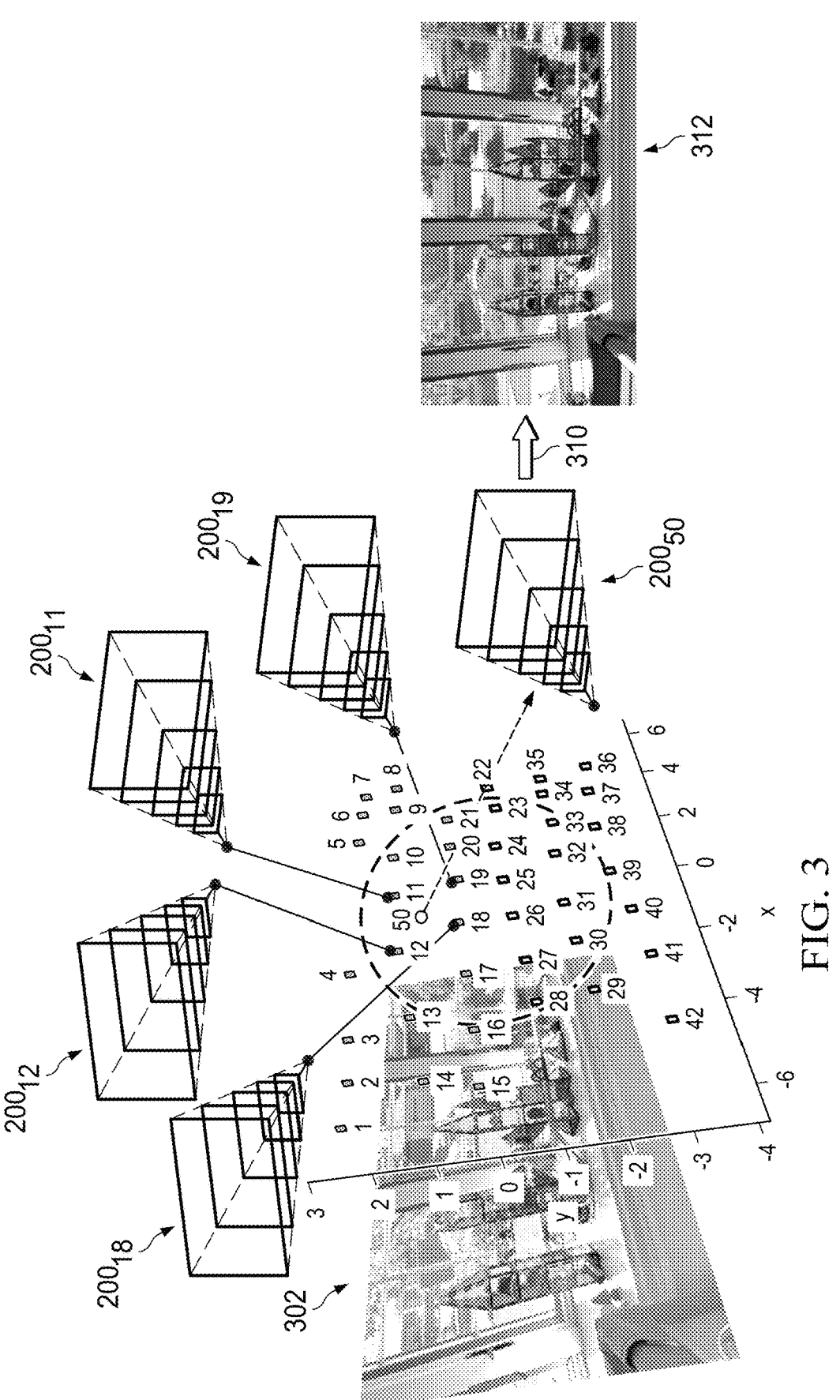
FIG. 3 pictorially illustrates a process of generating a novel view of a 3D scene according to one example.

FIG. 3 pictorially illustrates a process of generating a novel view of a 3D scene (302) according to one example. In the example shown, the 3D scene (302) is captured using forty-two RCPs (1, 2, . . . , 42). The novel view that is being generated corresponds to a camera position (50). The four closest RCPs to the camera position (50) are the RCPs (11, 12, 18, 19). The corresponding multiplane images are multiplane images (20011, 20012, 20018, 20019). A multiplane image (20050) corresponding to the camera position (50) is generated by correspondingly warping the multiplane images (20011, 20012, 20018, 20019) and then merging the resulting warped multiplane images. Finally, a viewable image (312) of the 3D scene (302) is generated by applying the compositing step (310) of the MPI-rendering algorithm to the multiplane image (20050).

In general, a 3D scene, such as the 3D scene (302) may be captured using any suitably selected number of RCPs. The locations of such RCPs can also be variously selected, e.g., based on the creative intent. In typical practical example, when a novel view, such as the viewable image (312) is rendered, only several neighboring RCPs are used for the rendering. Hereafter, such neighboring views are referred to as the "active views." In the example illustrated in FIG. 3, the number of active views is four. In other examples, a different (from four) number of active views may similarly be used. As such, the number of active views is a selectable parameter. For illustration purposes and without any implied limitations, example embodiments are described herein below in reference to four active views. In some examples, the set of active views may change over time when the camera position (50) moves. In some examples, the number of active views may change over time when the camera position (50) moves.

Figure 4:
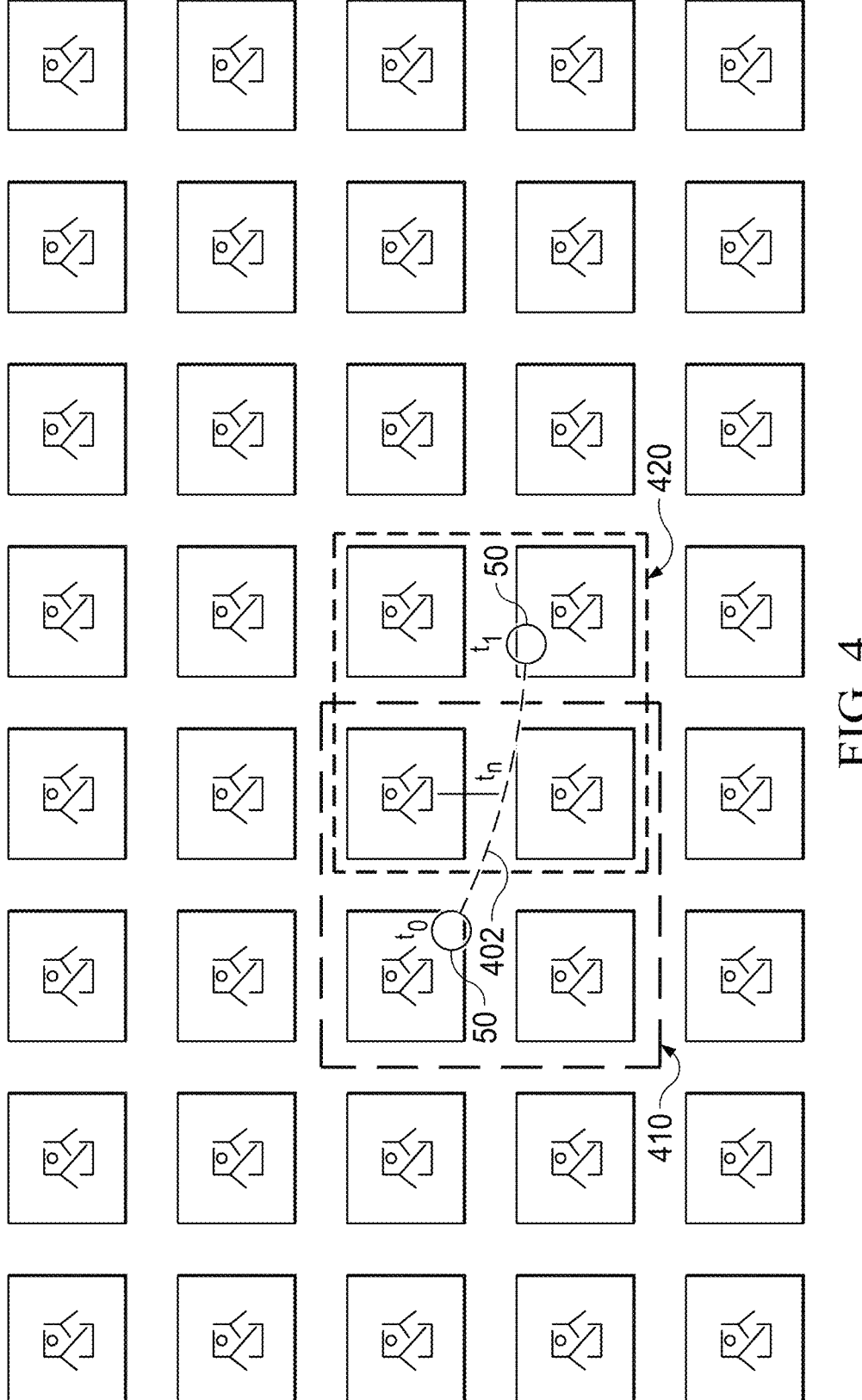
FIG. 4 is a block diagram illustrating a change of the set of active views over time according to one example.

FIG. 4 is a block diagram illustrating a change of the set of active views over time according to one example. In the example shown, a 3D scene is captured using a rectangular array of forty RCPs arranged in five rows and eight columns. A dashed arrow (402) represents a movement trajectory of the novel camera position (50) during the time interval starting at the time $t_0$ and ending at the time $t_1$ for virtual view synthesis. At the time $t_0$, the set of active views includes the four views encompassed by the dashed box (410). At the time $t_1$, the set of active views includes the four views encompassed by the dotted box (420). At the time $t_n$ (where $t_0 < t_n < t_1$), the set of active views changes from being the set in the dashed box (410) to being the set in the dotted box (420).

Transmission of Coded MPI Videos

Figure 5:
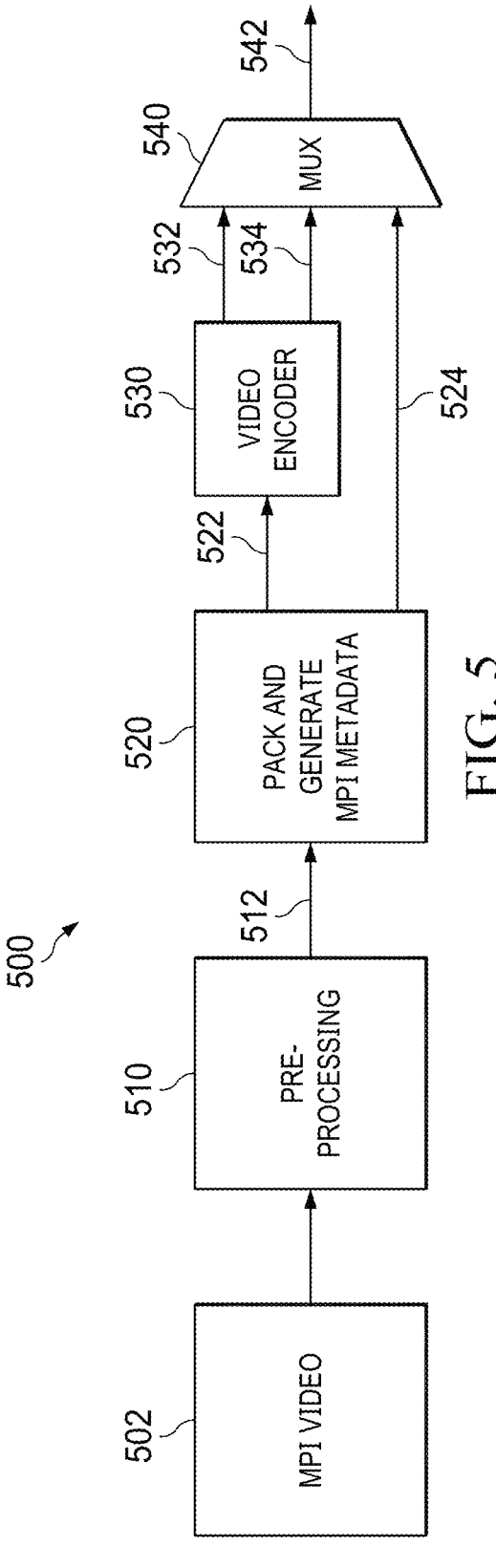
FIG. 5 is a block diagram illustrating an MPI encoder that can be used in the delivery pipeline of FIG. 1 according to an embodiment.

FIG. 5 is a block diagram illustrating an MPI encoder (500) according to an embodiment. In operation, the MPI encoder (500) transforms an MPI video (502) into a coded bitstream (542). The MPI video (502) has a sequence of multiplane images (200) corresponding to a sequence of times. In various examples, the MPI video (502) corresponds to a single view or has two or more components corresponding to multiple views (also see FIGS. 3-4). In some examples, the MPI video (502) is conveyed via the video/image stream (112) or (117). The coded bitstream (542) is transmitted to the corresponding MPI decoder via the coded bitstream (122).

The MPI video (502) undergoes preprocessing in a preprocessing block (510), which results in a preprocessed MPI video (512). Example preprocessing operations performed in the preprocessing block (510) include, but are not limited to, normalization, reshaping, padding, scaling, and refinement applied to at least one of a texture channel and an alpha channel. Representative examples of preprocessing operations that can be implemented in the preprocessing block (510) are described, e.g., in U.S. Provisional Patent Application No. 63/357,669, filed on Jul. 1, 2022, (filed also as PCT Patent Application PCT/US2023/69096, filed on 26

Jun. 2023), "Enhancement of texture and alpha channels in multiplane images," by G-M Su and P. Ying, which is incorporated herein by reference in its entirety. In some embodiments, a "masking" process can be employed during pre-processing to generate a "masked" texture channel that preserves only partial texture information according to a pre-defined binary mask M at sample location (u,v) (M(u, v)). If M(u,v) is true, C (u,v) is set to a constant value (e.g., zero or mid-grey). The mask M can be created by binarizing the alpha channel, i.e., if A (u,v)==0, then M(u,v)=1; else, M(u,v)=0. A morphological dilation process (e.g., denoted as ⊕) can also be applied when generating the binary mask. The alpha channel can be dilated with a structural element SE before binarization, for example, A'=(A⊕SE).

The MPI video (512) is transformed, in a packing block (520), into a packed 2D video (522). The video (522) has a format compatible with a video encoder (530). Example selectable packing options and the corresponding packing operations performed in the packing block (520) are described in more detail below, e.g., in reference to FIGS. 8-11. The packing block (520) also operates to generate an MPI metadata stream (524) configured to inform the corresponding MPI decoder about the selected packing option and to provide thereto various pertinent MPI parameters. Various nonlimiting examples of the MPI metadata stream (524) are described in more detail below, e.g., in reference to FIGS. 14A-14B and 15.

The video encoder (530) operates to covert the 2D video (522), e.g., by applying suitable video compression thereto, into a video bitstream (532) and a corresponding video metadata stream (534). In various examples, the video encoder (530) can be a High Efficiency Video Coding (HEVC) encoder, an MPEG-4 Advanced Video Coding (AVC) encoder, a FLOSS encoder, or any other suitable video encoder. A multiplexer (MUX) (540) operates to generate the coded bitstream (542) by suitably multiplexing the video bitstream (532), the video metadata stream (534), and the MPI metadata stream (524). In some other examples, the MPI metadata stream (524) can be incorporated into or be a part of the video metadata stream (534).

Figure 6:
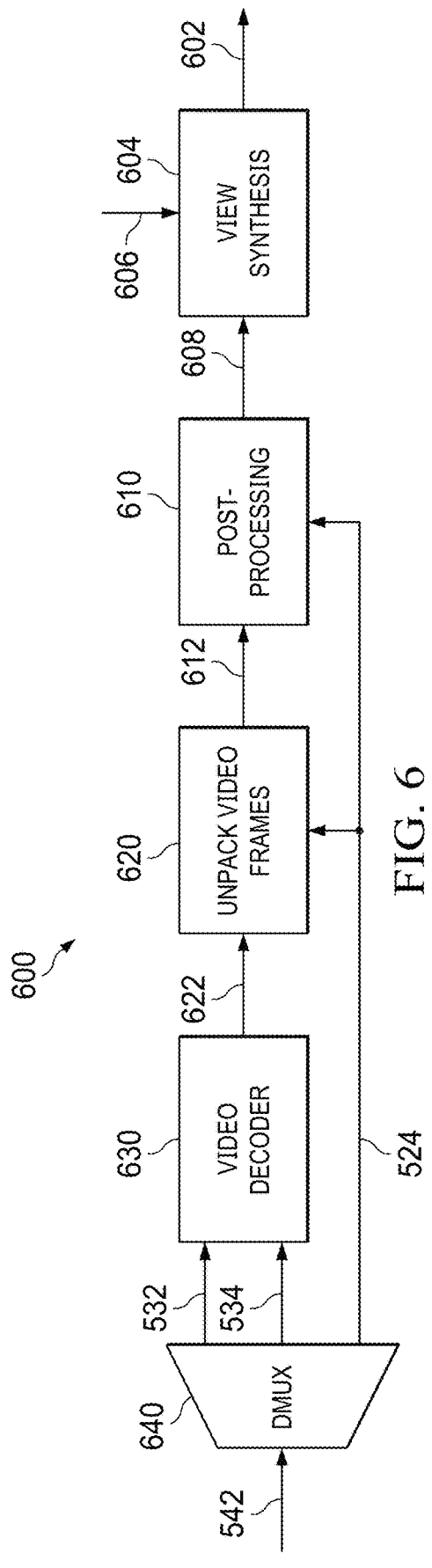
FIG. 6 is a block diagram illustrating an MPI decoder that can be used in the delivery pipeline of FIG. 1 according to an embodiment.

FIG. 6 is a block diagram illustrating an MPI decoder (600) according to an embodiment. The MPI decoder (600) is designed to be compatible with the corresponding MPI encoder (500). In operation, the MPI decoder (600) receives the coded bitstream (542) generated by the corresponding MPI encoder (500) as an input and generates an MPI video (602) corresponding to a camera position (606) as an output. In a representative example, the camera position (606) is specified to the MPI decoder (600) by the viewer and can be the same as one of the RCPs (also see FIG. 3) or be different from any of the RCPs. In some examples, the camera position (606) can be a function of time (also see FIG. 4).

In operation, a demultiplexer (DMUX) (640) demultiplexes the received coded bitstream (542) to recover the video bitstream (532), the video metadata stream (534), and the MPI metadata stream (524). In some examples, the MPI metadata stream (524) is a part of the video metadata stream (534), as mentioned above. In such examples, operations of the DMUX (640) are adjusted accordingly. A video decoder (630) is compatible with the video encoder (530) and operates to decompress the video bitstream (532) using the video metadata stream (534), thereby generating a 2D video (622). When lossy compression is used, the 2D video (622) is not an exact copy of the 2D video (522) but rather is a relatively close approximation thereof. When lossless compression is used, the 2D video (622) is a copy of the 2D video (522). In either case, the 2D video (622) lends itself to unpacking operations configured to be inverse to the packing operations performed in the packing block (520). Such unpacking operations on the 2D video (622) are performed in an unpacking block (620) based on the MPI metadata stream (524) and result in an MPI video (612) being generated at the output of the unpacking block (620). A post-processing block (610) operates to apply post-processing operations to the MPI video (612) to generate an MPI video (608). Based on the camera position (606), a synthesis block (604) renders the MPI video (608) to generate a viewable video (602) corresponding to the camera position (606). In various examples, the rendering operations performed in the synthesis block (604) include some or all of the following: warping multiplane images corresponding to one or more of the active RCPs, merging warped multiplane images, and compositing the pertinent sequence of MPI images to generate the viewable video (602).

As already indicated above, the blocks (520, 530) of the MPI encoder (500) and the corresponding blocks (630, 620) of the MPI decoder (600) operate in a compatible way. For example, the design and configuration of the packing block (520) depends on the selected type of the video encoder (530). In addition, the configurations of the corresponding blocks (630, 620) of the MPI decoder (600) needs to be compatible with the choices/configurations made for the blocks (520, 530) of the MPI encoder (500). For illustration purposes and without any implied limitations, codec parameters that influence the design and cross-compatibility of the blocks (520, 530, 630, 620) are described below in reference to the HEVC encoders/decoders. From the provided description, a person of ordinary skill in the pertinent art will readily understand how to guide the design and ensure cross-compatibility of the blocks (520, 530, 630, 620) for other types of video encoders/decoders (530, 630).

Many HEVC encoding tools let the user select the Main or Main 10 profile. The Main profile supports eight bits per sample, which allows for 256 shades per primary color, or 16.7 million colors in a video. In contrast, the Main 10 profile supports up to ten bits per sample, which allows for up to 1024 shades and over 1 billion colors. Readily available (e.g., off the shelf) video encoders/decoders typically support the HEVC Main or Main 10 profile up to the level 6.2. For example, the level 5.1 coding is relatively common to hardware-implemented decoders. As such, we focus our discussion below on the level 5.1 and higher, up to the level 6.2.

FIG. 7 is a table illustrating example constraints imposed on the design and cross-compatibility of the blocks (520, 530, 630, 620) by the 5.1, 5.2, and 6.x levels specifications according to some examples. More specifically, the maximum luma sample rate (MaxLumaSr), maximum luma picture size (MaxLumaPs), maximum DPB size (MaxDpbSize), and maximum number of tiles (in rows and column) are all selected based on this table. In some examples, the bitrate and compression ratio values can be satisfied using the rate control (QP adaptation). It is also noted that the luma sample rate (samples/second) is equal to the product of the luma picture size (samples/picture) and the picture rate (pictures/second). In some examples, the picture rate and the frame rate are the same.

In various examples, the layered representations of MPI images are packed or concatenated spatially and/or temporally to create an input for the HEVC video codec. The following description provides some pertinent details on the level/profile constraints, from the HEVC specification, regarding the A.4 Tiers and Levels. The corresponding sections in the HEVC specification are "A.4.1: General tier and level limits" and "A.4.2: profile-specific level limits for the video profiles."

Regarding the tier and level limits, some or all of the following features may be considered.

Let access unit n be the n-th access unit in decoding order, with the first access unit being access unit 0 (i.e., the 0-th access unit).

Let picture n be the coded picture or the corresponding decoded picture of access unit n.

In some examples, bitstreams conforming to a profile at a specified tier and level obey the following constraints:

a) PicSizeInSamplesY is less than or equal to MaxLumaPs.

b) The value of pic_width_in_luma_samples is less than or equal to Sqrt (MaxLumaPs*8).

c) The value of pic_height_in_luma_samples is less than or equal to Sqrt (MaxLumaPs*8).

d) For level 5 and higher levels, the value of CtbSizeY is equal to 32 or 64.

e) The value of NumPicTotalCurr shall be less than or equal to 8.

f) The value of num_tile_columns_minus1 shall be less than MaxTileCols and num_tile_rows_minus1 shall be less than MaxTileRows.

Regarding the profile-specific level limits for the video profiles, some or all of the following features may be considered.

In some examples, the value of sps_max_dec_pic_buffering_minus1[HighestTid]+1 is less than or equal to MaxDpbSize, which is derived as follows:

```
if( PicSizeInSamplesY <= ( MaxLumaPs >> 2 ) )
    MaxDpbSize = Min( 4 * maxDpbPicBuf, 16 )
else if( PicSizeInSamplesY <= ( MaxLumaPs >> 1 ) )
    MaxDpbSize = Min( 2 * maxDpbPicBuf, 16 )
else if( PicSizeInSamplesY <= ( ( 3 * MaxLumaPs ) >> 2 ) )
    MaxDpbSize = Min( ( 4 * maxDpbPicBuf ) / 3, 16 )
else
    MaxDpbSize = maxDpbPicBuf
``` where MaxLumaPs is specified in Table A.8, and maxDpbPicBuf is equal to 6 for all profiles, where the value of sps_curr_pic_ref_enabled_flag is equal to 0 and 7 for all profiles, where the value of sps_curr_pic_ref_enabled_flag is not equal to 0.

In some examples, the maximum frame rate supported by the codec is 300 frames per second (fps). The MaxDpbSize, maximum number of pictures in the decoded picture buffer, for the maximum luma picture size of that level is 6 for all levels. The MaxDpbSize can increase to a maximum of 16 frames, if the luma picture size of the video is smaller than the maximum luma picture size of that level, in incremental steps of 4/3×, 2×, or 4×.

In some examples, the following low pixel rate test condition constraints are applied:

The combined maximum luma sample rate across all decoders is maximally 1,069,547,520 samples per second (e.g., 32 MP @30 fps, corresponding to the HEVC Main 10 profile @ Level 5.2)

Each decoder instantiation is constrained to a maximum luma picture size of 8,912,896 pixels (e.g., 4096×2048, corresponding to the HEVC Main 10 profile @ Level 5.2).

The maximum number of simultaneous decoder instantiations is four.

In some examples, the following high pixel rate test condition constraints are applied:

The combined maximum luma sample rate across all decoders is maximally 4,278,190,080 samples per second (e.g., 128 MP @30 fps, corresponding to HEVC Main 10 profile @ Level 6.2)

Each decoder instantiation is constrained to a maximum luma picture size of 35,651,584 pixels (e.g., 8192×4096, corresponding to HEVC Main 10 profile @ Level 6.2).

The maximum number of simultaneous decoder instantiations is four.

In some examples, the maximum number of simultaneous decoders is four for level 5.2 and level 6.2. The pixel rate specification for multiple decoders is:

multiple decoder instances (e.g., 4) together are constrained to 1 hardware (HW) level set of limitations.

Example MPI Video Coding Solutions

In some examples, a multiplane image (200) has 32 layers for each frame at one camera view. In some examples, adaptive layer merging methods are used to reduce 32 layers to 16 layers while substantially preserving the subjective quality of the synthesized novel views, e.g., as described in U.S. Provisional Patent Application Nos. 63/429,875 and 63/429,878, filed Dec. 2, 2022, both of which are incorporated herein by reference in their entirety. For illustration purposes and without any implied limitations, some representative examples are described herein below in reference to the 16-layer MPI representation.

In one example, the MPI distribution capability is defined using the following parameters:

Picture size: up to 720p (1280×720)

The picture size can be padded to multiples of CTU sizes (e.g., 64×64) in order to fill in the HEVC tile structure. This feature allows for more flexibility for the encoder control to not allow loop filter across MPI picture boundary and also later for transcoding when needed.

For novel-view rendering, cropping is used to remove boundary artifacts. In this case, tiles might not be use for coding.

Number of MPI layers: 8 or 16 layers. For the 8-layer design, multi-CTUs/Tile based MPI decomposition and/or adaptive layer merging can be used.

for CTU/tile based MPI design, postprocessing is used to fix multi-CTUs/tile boundary artifacts.

Number of camera views to transmit simultaneously to be used to render a novel view: for example, up to 4 nearest neighbors.

May also use 1, 2, or 3 views. A smaller number of views may result in more pronounced residual artifacts.

In some examples, more than four views can also be used.

Frame rate for video at each camera position: 30 fps (also referred to as the picture rate).

Delay: (this parameter has an impact on the coding structure, intra refresh period): When a relatively low delay is needed, the coding structure can be configured to avoid the use of re-ordered pictures (e.g., B-frames). When the application commands frequent changes of "active" views for novel view rendering, the intra refresh period (I/IDR frames) can be used relatively more frequently to mitigate possible delay increases.

Pose generation: in an example application, new pose is generated by the director (referred to as the automatic generation), slow or fast moving, or controlled by the user in an interactive fashion. This feature may have an impact on how many neighboring views are selected to generate a novel view.

for direct viewing, one can encode a single MPI video. It is also noted in the following discussion that, for one HW decoder, we consider the following two cases to be indistinguishable:

one decoder instance is constrained to 1 HW level limitation;

multiple decoder instances (e.g., 4) are together constrained to 1 HW level limitation.

For illustration purposes, we use the one decoder instance to present different solutions. A person of ordinary skill in the pertinent art will readily understand how to adapt those solutions to multiple decoder instances.

Herein, the term "coding tree unit" (CTU) refers to the basic processing unit of the High Efficiency Video Coding (HEVC) standard and conceptually corresponds in structure to the various macroblock units used in several earlier video standards. In some literature, the CTU is also referred to as the largest coding unit (LCU). In various examples, a CTU has a size in the range between 16×16 pixels and 64×64 pixels, with a larger size usually leading to increased coding efficiency.

In various examples, spatial packing, temporal packing, or a combination of spatial and temporal packing can be used for packing texture and alpha layers of a multiplane image (200) into a HEVC frame. For spatial packing, the picture size will be 2× of the spatial resolution of the original camera view because the MPI encoder (500) operates to pack both texture and alpha layers together, i.e., luma sample rate=2× luma picture size×frame rate.

Tables 1 and 2 below show example picture sizes for video resolutions 360p, 480p, 540p, and 720p. For Table 1, the CTU size is 64×64 pixels. For Table 2, the CTU size is 32×32 pixels. For Table 3, the picture size is not restricted to be an integer multiple of the CTU size, and no padding is performed. For compression in the video encoder (530), the texture layers are converted from RGB to YCbCr 4:2:0, 8—or 10-bit format. Alpha layers are quantized to 8/10 bits and loaded as the Y components. The corresponding Cb and Cr components are loaded with dummy (e.g., constant) values.

TABLE 1

| Examples of picture resolutions (CTUSize = 64) | | | | |
| --- | --- | --- | --- | --- |
| | width with padding | height with padding | picture size | texture + alpha |
| 720p (1280 × 720) | 1280 | 768 | 983040 | 1966080 |
| 540p (960 × 540) | 960 | 576 | 552960 | 1105920 |
| 480p (640 × 480) | 640 | 512 | 327680 | 655360 |
| 360p (480 × 360) | 512 | 384 | 196608 | 393216 |

TABLE 2

| Examples of picture resolutions (CTUSize = 32) | | | | |
| --- | --- | --- | --- | --- |
| | width with padding | height with padding | picture size | texture + alpha |
| 720p (1280 × 720) | 1280 | 736 | 942080 | 1884160 |
| 540p (960 × 540) | 960 | 544 | 522240 | 1044480 |
| 480p (640 × 480) | 640 | 480 | 307200 | 614400 |
| 360p (480 × 360) | 480 | 384 | 184320 | 368640 |

TABLE 3

| Examples of picture resolutions (No padding) | | | | |
| --- | --- | --- | --- | --- |
| | width | height | picture size | texture + alpha |
| 720p (1280 × 720) | 1280 | 720 | 921600 | 1843200 |
| 540p (960 × 540) | 960 | 540 | 518400 | 1036800 |
| 480p (640 × 480) | 640 | 480 | 307200 | 614400 |
| 360p (480 × 360) | 480 | 360 | 172800 | 345600 |

According to one selectable configuration (hereafter "Option 1"), the packing block (520) is configured to generate the 2D video (522) by spatially packing texture and alpha layers of a multiplane image (200) into a single video frame, with different video frames carrying the multiplane images (200) corresponding to different respective RCPs (or views of the scene) at the corresponding time t. According to one implementation of Option 1, the packing block (520) supports the following operations and features:

Arrange the texture and alpha layers of the multiplane image (200) corresponding to one view spatially.

Arrange multiplane images (200) corresponding multiple views temporally, e.g., in an interleaving fashion.

Each texture/alpha layer may be contained in a tile structure when CTU-based padding is used. In such cases, loop filtering can be disabled at the tile boundary; the Motion Constraint Tile Set (MCTS) coding is not required.

All texture layers of the multiplane image (200) are grouped in one rectangular region of the video frame, and all alpha layers of the same multiplane image (200) are grouped in another rectangular region. The two regions can be contained in two independent slices to allow for different respective QP settings. For example, low QP values can be used for the texture slices, and high QP values can be used for the alpha slices.

Low delay P coding structure can be used with periodic IDR refreshing to support view changes on the fly. In some examples, a random-access coding structure can be used for higher coding efficiency when the delay parameter is not of relatively great importance.

Views can be independently coded via multiple codec instances; this feature can be used, e.g., to support changes in the number of views on the fly (e.g., use 3 views/2 views/1 view).

According to various examples, the arrangement of texture or alpha tiles from all layers of the multiplane image (200) is flexible. For example, when 16 MPI layers are used, i.e., D=16, the layout of the tiles can be selected from the 1×16, 2×8, 4×4, 8×2, and 16×1 layouts. In different examples, the arrangement of texture and alpha slices is side-by-side or top-and-bottom. Note that the arrangement does not violate the tile row/column constraints specified in the table of FIG. 7. Another option is to first pack texture and alpha for one MPI layer (top—and bottom, or side-by-side, or pixel interleaving), and proceed in this manner to pack all remaining MPI layers of the multiplane image (200).

Herein, the term "IDR frame" refers to a special type of I-frame in H. 264. More specifically, an IDR frame signals that no frame after that IDR frame can reference any frame before it.

Figure 8:
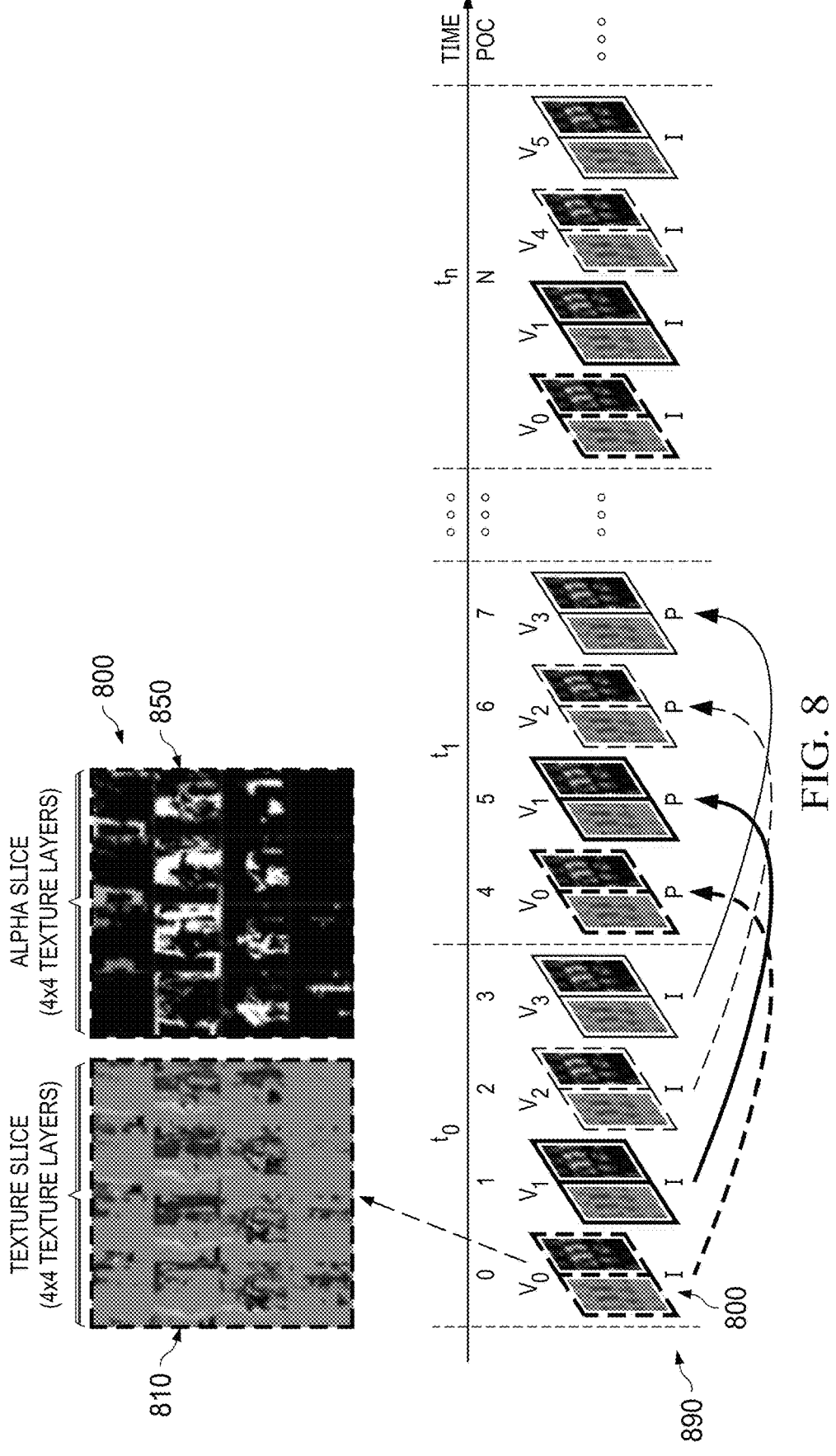
FIG. 8 is a diagram illustrating packing operations of the MPI encoder of FIG. 5 according to one example.

FIG. 8 is a diagram illustrating operations of the packing block (520) according to one example. The shown example is an example of the above-described Option 1, wherein four views (corresponding to four different views) are transmitted. The set of transmitted views changes over time, e.g., as described above in reference to FIG. 4. For example, for the MPI video time $t_0$, the set of transmitted views consists of the four views ($V_0$, $V_1$, $V_2$, $V_3$). In contrast, for the MPI video time $t_n$, the set of transmitted views consists of the four views ($V_0$, $V_1$, $V_4$, $V_5$). Depending on the temporal position in an MPI video sequence (890), the transmitted frames (800) can be I-frames or P-frames. In some examples, B-frames (800) can also be transmitted in some temporal positions of the MPI video sequence (890).

An expanded view of one of the transmitted frames (800) illustrates a tile structure thereof in more detail. In the example shown, a frame (800) includes a texture slice (810) and an alpha slice (850) that are packed in the frame side-by-side. The sixteen tiles within each of the slices (810, 850) carry the corresponding (texture or alpha) channels of the respective sixteen layers (D=16, FIG. 2) of the multiplane image (200). Each set of the sixteen tiles is arranged using the 4×4 spatial layout. The corresponding MPI decoder (600) can be implemented using four decoding instances. As a result, different ones of the four views of each transmitted set of views can be queued and processed in a more straightforward manner. For illustration purposes, in the following discussion of the level constraints, we will assume that the corresponding four bitstreams are assembled into one bitstream. It should also be noted that when the MPI encoder (500) operates under the constraint that only one reference picture can be used, the assembling operations can be implemented with relatively small modifications implemented at a high level, e.g., with appropriate updating of the Picture Order Counter (POC) number, etc.

The decoded picture buffer (DPB) in HEVC is a buffer holding decoded pictures for reference, output reordering, or output delay specified for the hypothetical reference decoder in Annex C of the HEVC specification. The current decoded picture is also stored in the DPB. The minimum DPB size that the decoder needs to allocate for decoding a particular bitstream is signaled by the sps_max_dec_pic_buffering_minus1. The maximum number of pictures in the decoded picture buffer, for the maximum luma picture size of that level is 6 for all levels. The maximum DPB size can increase up to 16 frames, if the luma picture size of the video is smaller than the maximum luma picture size of that level, in incremental steps of 4/3×, 2×, or 4×.

Table 4 below shows the pictures in the DPB based on the Group of Pictures (GOP) structure illustrated in FIG. 8. At any time, the DPB is configured to keep at most four pictures and will not exceed the maximum allowed value (6). The corresponding sufficient DPB size depends on the number of supported views. In some examples, the minimum DPB size can be set equal to the number of supported views when only one reference picture is used from the same view.

TABLE 4

DPB analysis for the example shown in FIG. 8

| decoded picture | pictures in DPB |
| --- | --- |
| POC 0 | 0 |
| POC 1 | 0, 1 |
| POC 2 | 0, 1, 2 |
| POC 3 | 0, 1, 2, 3 |
| POC 4 | 1, 2, 3, 4 |
| POC 5 | 2, 3, 4, 5 |

TABLE 4-continued

DPB analysis for the example shown in FIG. 8

| decoded picture | pictures in DPB |
| --- | --- |
| POC 6 | 3, 4, 5, 6 |
| POC 7 | 4, 5, 6, 7 |
| . . . | . . . |
| POC N | N |

Using four neighboring views (also see FIG. 4), the MPI decoder (600) can be configured to perform MPI novel view rendering, e.g., as follows: for a given source view Vi (i=0, . . . , 3), we first apply warping to each MPI plane, then obtain the target novel view NVi by alpha compositing the color images in back-to-front order. The final novel view is a weighted sum of the novel views NV0, NV1, NV2, NV3. This means that, after the view Vi is decoded, it does not need to wait for the other decoded view, and the view can be immediately sent to the GPU engine for the rendering process. As such, the above-described decoding does not appear to impose any additional burden on the DPB. For example, for every four decoded frames, the corresponding one novel view can be rendered in an expeditious manner.

Example parameter combinations for the 360p, 480p, 540p, and 720p resolutions for D=16 and for D=8 are shown in Table 5 below, wherein the FPS rate=30× number of supported views. The parameters shown in Table 5 are applicable to both CTUSize=64 and CTUSize=32.

TABLE 5

Examples of MPI transmission scenarios for HEVC level 5.x and 6.x; Option 1

| | Example combinations | |
| --- | --- | --- |
| | Option1 (SbS packing, 16 layers: 8 × 4) | Option 1 (SbS packing, 8 layer: 8 × 2 or 4 × 4) |
| level 5.1 | 360p 16 layers × 2 views, MaxDPBSize = 8 | 540p 8 layers × 2 views, MaxDPBSize = 6 480p 8 layers × 3 views, MaxDPBSize = 8 360p 8 layers × 4 views, MaxDPBSize = 12 |
| level 5.2 | 360p 16 layers × 4 view | 540p 8 layers × 4 views, MaxDPBSize = 6 480p 8 layers × 4 view |
| level 6.0 | 540 16 layers × 2 views, MaxDPBSize = 12 720p 16 layers × 1 view, MaxDPBSize = 6 | 540 8 layers × 4 views, MaxDPBSize = 16 720p 8 layers × 2 views, MaxDPBSize = 12 |
| level 6.1 | 540 16 layers × 4 views, MaxDPBSize = 12 720p 16 layers × 2 views, MaxDPBSize = 6 | 720p 8 layers × 4 views, MaxDPBSize = 12 |
| level 6.2 | 720p 16 layers × 4 views, MaxDPBSize = 6 | |

According to another selectable configuration (hereafter "Option 2"), the packing block (520) is configured to generate the 2D video (522) by spatially packing views (texture and alpha channels) into a set of video frames, with different video frames of the set carrying different respective layers of the multiplane images (200) corresponding to the views of the scene at the corresponding time t. According to one implementation of Option 2, the packing block (520) supports the following operations and features:

Arrange the texture and alpha of a particular layer from the multiplane images (200) corresponding to multiple RCPs spatially in a video frame. Arrange the layers temporally by placing into different video frames of the set. Similar to Option 1, the texture and alpha layers from multiple views each takes a respective tile. The alpha tiles are grouped into an alpha slice and the texture tiles are grouped into a texture slice of the frame.

Option 2 can be useful for levels 5.1 and 5.2 to enabling transmission of the 720p videos. Option 1 does not support the 720p transmission with level 5.x, because the spatial resolution constraint allows for only four layers of MPI.

Multiple views are packed spatially, which may add complexity to the processing directed at varying (e.g., reducing, replacing, etc.) the views compared to Option 1.

The maximum frame rate supported by the HEVC is 300 frames per second (fps). If reference views have the rate of 30 fps, then the maximum number of layers supported by Option 2 is 300/30=10 layers.

Figure 9:
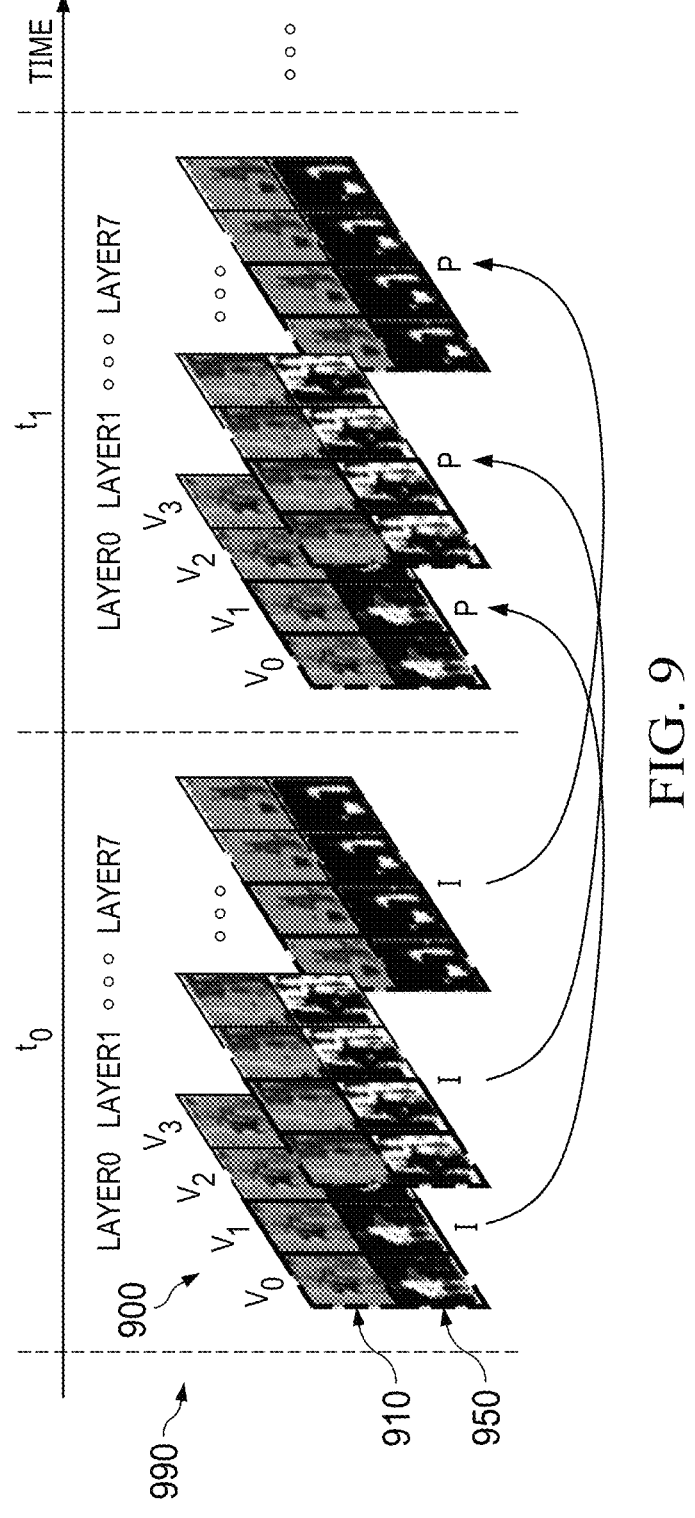
FIG. 9 is a diagram illustrating packing operations of the MPI encoder of FIG. 5 according to another example.

FIG. 9 is a diagram illustrating operations of the packing block (520) according to another example. The shown example is an example of the above-described Option 2, wherein four views ($V_0$, $V_1$, $V_2$, $V_3$) are transmitted. Depending on the temporal position in an MPI video sequence (990), the transmitted frames (900) can be I-frames or P-frames. In some examples, B-frames (900) can also be transmitted in some temporal positions of the MPI video sequence (990).

In the example shown, a frame (900) includes a texture slice (910) and an alpha slice (950) that are stacked vertically (top-to-bottom). The four tiles within the texture slice (910) are packed using the 1×4 layout and carry the texture channels of the corresponding layer of the four views ($V_0$, $V_1$, $V_2$, $V_3$), respectively. The four tiles within the alpha slice (950) are also packed using the 1×4 layout and carry the alpha channels of the corresponding layer of the four views ($V_0$, $V_1$, $V_2$, $V_3$), respectively. The eight layers (D=8, FIG. 2) of the corresponding multiplane images (200) are placed into different consecutive video frames (900) of the sequence (990) as indicated in FIG. 9.

In the example shown in FIG. 9, eight layers (D=8, FIG. 2) are temporally interleaved. The corresponding DPB size is eight pictures. As such, the MaxDpbSize parameter is set to >=8. In this case, the DPB size does not depend on the number of views. Table 6 lists examples of MPI delivery scenarios based on the HEVC profile 5.0 to 6.2 for Option 2. In some examples, Option 2 is used to support the 720p video in level 5.x.

TABLE 6

| Examples of MPI transmission scenarios for HEVC levels 5.x and 6.x; Option 2 | |
| --- | --- |
| | Example combinations (all examples @ 30 fps) |
| level 5.1 | 720p 1 view × 8 layers, MaxDpbSize = 16, FPS = 240 |
| level 5.2 | 720p 2 views × 8 layers MaxDpbSize = 12, FPS = 240 |

According to another selectable configuration (hereafter "Option 3"), the packing block (520) is configured to generate the 2D video (522) by spatially packing texture and alpha layers of a multiplane image (200) into pairs of video frames, with different pairs carrying the multiplane images (200) corresponding to different respective views of the scene at the corresponding time t. Option 3 differs from Option 1 in that texture layers and alpha layers are packed into different, temporally interleaved video frames. Therefore, the frame rate for Option 3 is 2× of the frame rate of the original camera view, but the corresponding luma_picture_size is halved. The total frame rate in this example is 2×30×number_of_views. For four views, the frame rate is 240 fps, which is lower than the constraint of 300 fps.

Figure 10:
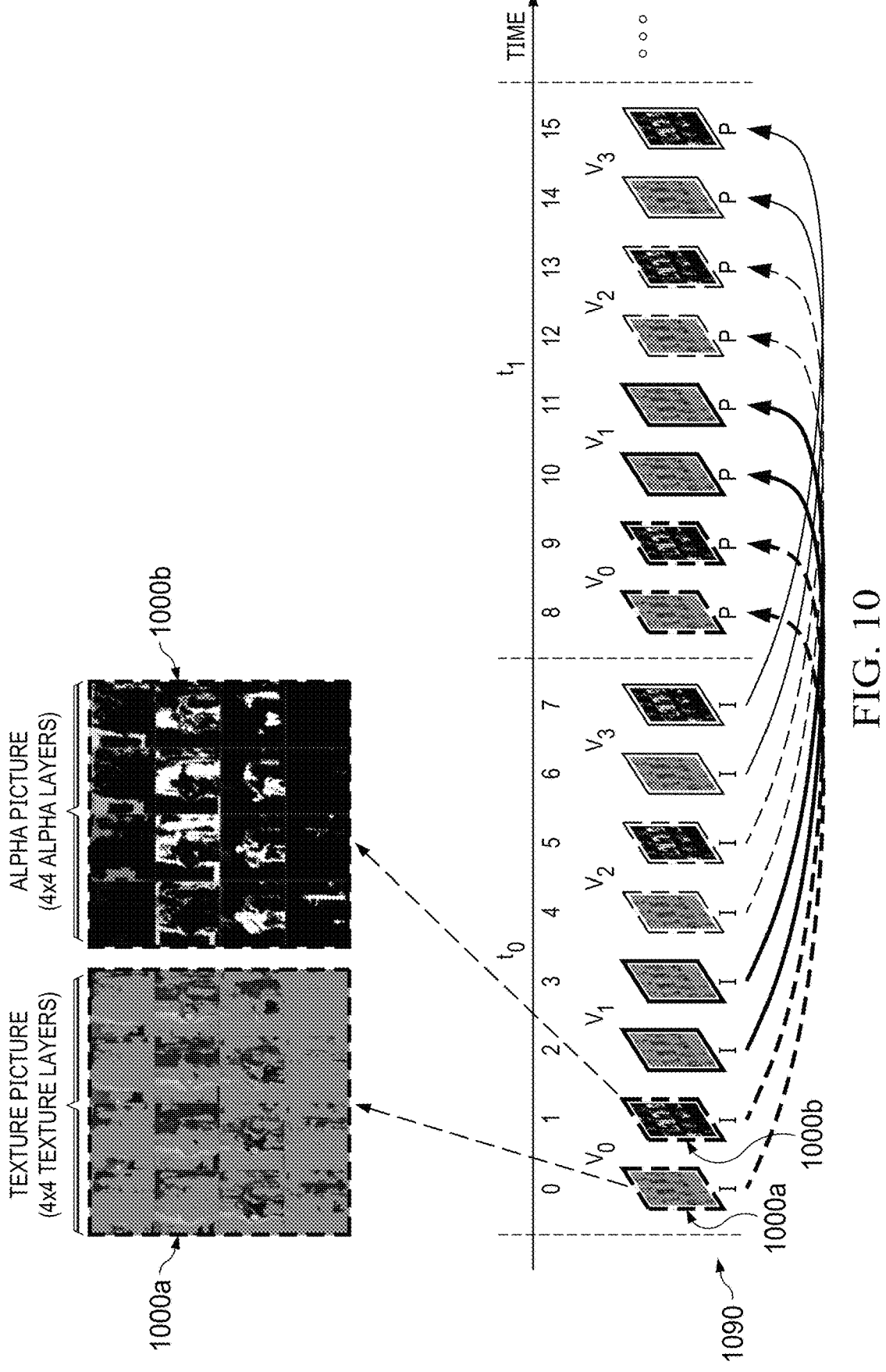
FIG. 10 is a diagram illustrating packing operations of the MPI encoder of FIG. 5 according to yet another example.

FIG. 10 is a diagram illustrating operations of the packing block (520) according to yet another example. The shown example is an example of the above-described Option 3, wherein four views ($V_0$, $V_1$, $V_2$, $V_3$) are transmitted. Depending on the temporal position in an MPI video sequence (1090), the transmitted frames (1000) can be I-frames or P-frames. In some examples, B-frames (1000) can also be transmitted in some temporal positions of the MPI video sequence (1090).

An expanded view of a pair of the transmitted video frames (1000a, 1000b) illustrates a tile structure thereof in more detail. In the example shown, the frame (1000a) includes a texture slice, and the frame (1000b) includes an alpha slice. The sixteen tiles within the video frame (1000a) carry the texture channels of the sixteen layers (D=16, FIG. 2) of the multiplane image (200) corresponding to the view ($V_0$). The sixteen tiles within the video frame (1000b) carry the alpha channels of the sixteen layers of the multiplane image (200) corresponding to the view ($V_0$). Each set of sixteen tiles is arranged using the 4×4 spatial layout. The next two video frames (1000) have a similar structure and carry the texture and alpha channels, respectively, of the multiplane image (200) corresponding to the view ($V_1$), and so on. In another example, the first frame (1000a) includes all alpha layers, and the second frame (1000b) includes all texture layers.

In yet another example, an auxiliary picture, as defined in the H.264/AVC fidelity range extension or the Multiview-HEVC extension, may be used to mimic temporally interleaved transmission of alpha layers and texture layers. The packed alpha layers can be compressed in the auxiliary picture corresponding to the primary coded picture, which carries the packed texture layers. To recover a multiplane image, the corresponding decoder needs to be appropriately configured to decode auxiliary pictures.

Compared to Option 1, the picture size for Option 3 is reduced by a factor of two, and the total frame rate is doubled. For the DPB analysis, the minimum DPB size is 2× number_of_views. Table 7 below shows example MPI transmission scenarios for Option 3. The parameters shown in Table 7 are applicable to both CTUSize=64 and CTUSize=32.

TABLE 7

| Examples of MPI transmission scenarios for HEVC levels 5.x and 6.x; Option 3 | | |
| --- | --- | --- |
| | Example combinations | |
| | 8 layers: 4 × 2 packing | 16 layers: 4 × 4 packing |
| level 5.1 | 720p 8 layers × 1 views, MaxDPBSize = 6 | |
| level 5.2 | 720p 8 layers × 2 views, MaxDPBSize = 6 | |
| level 6.0 | 720p 8 layers × 2 views, MaxDPBSize = 16 | 720p 16 layers × 1 views, MaxDPBSize = 12 |
| level 6.1 | 720p 8 layers × 4 views, MaxDPBSize = 16 | 720p 16 layers × 2 views, MaxDPBSize = 12 |

TABLE 7-continued

| Examples of MPI transmission scenarios for HEVC levels 5.x and 6.x; Option 3 | |
|---|---|
| Example combinations | |
| 8 layers: 4 × 2 packing | 16 layers: 4 × 4 packing |
| level 6.2 | 720p 16 layers × 4 views, MaxDPBSize = 12 |

A challenging factor in designing the packing operations for the packing block (520) is to ensure conformance to the pertinent MaxLumaPs constraint. In some embodiments, at least some of the packing variations listed below can be applied in addition to the above-described Options 1-3 to make the packing relatively more compact for such conformance.

1) Reduce the Resolution of Some Layers:

For example, alpha layers can be downsampled by 2× horizontally, or vertically, or both, for all alpha layers or several selected layers. The upsampling filter for the decoder side to recover the alpha layers to original size is specified in the metadata.

In another example, a subset of texture layers can be downsampled by 2× horizontally, or vertically, or both. The upsampling filter for the decoder side to recover the texture layers to the original size is specified in the metadata.

In some examples, the texture/alpha layers can be downsampled in a paired way (e.g., by selecting a subset of layers and applying a same downsampling factor to the corresponding texture and alpha layers), or in a non-paired way (e.g., downsampling can be independently applied to any selected layer).

2) Use Non-Equal Numbers of Layers for Texture and Alpha Layers:

For example, reduce the number of texture layers while keeping the number of alpha layers unchanged, merge 16 texture layers into 4 layers (e.g., by merging 4 adjacent layers together); and still use 16 layers of alpha. At the rendering stage (610, 606), the merged texture layer is used with each of the four corresponding alpha layers.

3) Reduce the Bit-Depth of Alpha Layers.

Alpha layers may not need the full bit-depth (e.g., 10 bits) used in the luma layers. If we reduce the bit-depth of alpha layers and pack them in the bit-plane, then we can reduce the spatial resolution needed to store the alpha layers. For example, if we use 5 bits to quantize alpha layers and pack two adjacent alpha layers in the bit-plane to form a 10-bit alpha signal, then we can reduce the effective spatial resolution for the alpha layers by one half. In some cases, caution needs to be exercised with this approach as such packing may result in added high frequencies in the alpha signal, which may cause corresponding artifacts after lossy compression.

4) Make Use of the Dummy Cb/Cr Components of Alpha Layers

In some examples of the above packing options, the alpha layers have meaningful values in the Y component, and the CbCr components are filled with dummy constant values. Thus, it is possible to utilize these dummy CbCr components for a more-useful purpose. Considering the YCbCr 4:2:0 case as an illustrative example, the CbCr components can be used to carry the down-sampled alpha planes. For example, in a 16-layer case, eight layers can be selected (based on some suitable metric) to preserve the original resolution and be placed into the Y components. The other eight layers are down-sampled and placed into the CbCr components of the eight full resolution alpha layers. In some cases, caution needs to be exercised with this approach as the CbCr components will typically have very different characteristics compared with the Y component, which might cause difficulties with the prediction/motion compensation during the HEVC coding operations.

5) Block-Based MPI Generation.

To reduce the number of layers, one approach is to enable block-based MPI. This approach relies on the assumption that each block may typically have a different respective depth range. As a result, the reduced number of layers is possible for some blocks. The block size can be selected to be an integer multiple of the CTU size to case the compression operations. One can also reduce the complexity of MPI generation by using a larger block size. In addition, a larger block size causes a commensurate reduction in the metadata overhead. For example, one 720p picture can be divided into several large blocks, e.g., 5×3 large blocks, each having the size 256×256. MPI generation is then performed on each such block individually. The coding gain is likely to materialize because the number of layers needed to produce satisfactory rendering for a large block is typically less than the number of layers needed to guarantee similar quality for the whole 720p picture. In some cases, four layers are sufficient to realize such coding gain. In some cases, the number of MPI layers may be different for different large blocks. For example, blocks with relatively more complex scene content may need more MPI layers than blocks with simpler scene content. The latter may only need very few MPI layers for achieving good rendering quality. In some cases, caution needs to be exercised with this approach as there might be too many large blocks, which will prevent putting each of the large blocks into one common tile (due to the potential violation of the maximum number of tile rows/columns constraint) for the aggregated picture. Also, some large blocks having layers at different depth might cause additional boundary artifacts. As such, additional postprocessing may need to be implemented.

6) No Tile Alignment

In some of the above-discussed embodiments, for ease of compression, each MPI texture or alpha layer is padded to be an integer multiple of the CTU size. However, such padding may not be needed for at least some applications, e.g., applications in which the novel-view rendering is noticeably cropped, e.g., with a factor of 0.8 or smaller. This feature can also be used to reduce memory usage.

In various examples, at least some of the above variations can be applied in a combined fashion. For example, a combination of variations 1) and 2) is compatible with level 5.x and delivers 720p with Option 1 packing, using parameters listed in Table 8.

TABLE 8

| Examples of MPI transmission scenarios for HEVC level 5.x; Option 1 | |
| --- | --- |
| | Example combinations (all examples @ 30 fps) |
| level 5.1 | 720p (16 texture layers merged to 4, 16 alpha layers downsampled by 2×) × 2 views |
| level 5.2 | 720p (16 texture layers merged to 4, 16 alpha layers downsampled by 2×) × 4 views |

In some examples, the original image of the reference camera view can also be transmitted along with the MPI layer representation. The original image can then be used to perform post processing and to enhance the quality of the view synthesis. In some examples, the original image can be packed as an additional texture layer (in which case the total number of layers becomes D+1). The corresponding alpha layer can be filled with a (dummy) constant value. In some other examples, the original image can replace an existing texture layer (e.g., the one with the least accumulated weights). The corresponding alpha layer is also replaced by a (dummy) constant value. In both cases, metadata are signaled to enable the decoder to properly handle the received transmissions.

Figure 11:
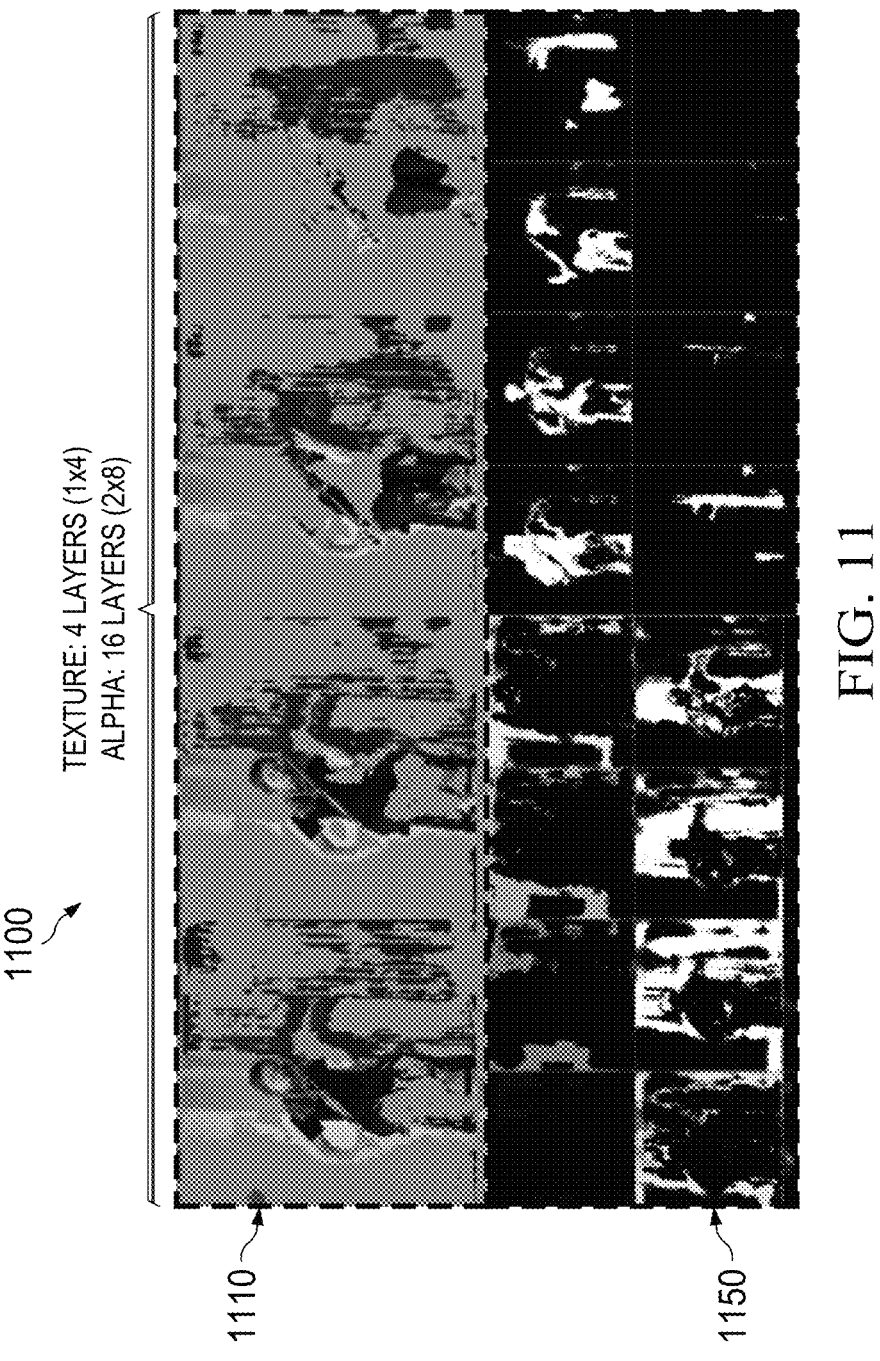
FIG. 11 is a diagram illustrating packing operations of the MPI encoder of FIG. 5 according to yet another example.

FIG. 11 is a diagram illustrating operations of the packing block (520) according to yet another example. The shown example is an example in which the above-described variations 1) and 2) are combined to generate a 2D video frame (1100) having packed therein four texture layers and sixteen downsampled alpha layers. The frame (1100) includes a texture slice (1110) and an alpha slice (1150) that are stacked vertically (top-to-bottom). The four tiles within the texture slice (1110) are packed using the 1×4 layout. The sixteen tiles within the alpha slice (1150) are packed using the 2×8 layout. The picture size in this example is the same as that of Option 1 with four layers.

Table 9 illustrates an additional example to support the reduced 720p use case. The corresponding multiplane image (200) has eight layers (D=8). In the 2D video frame, we have eight texture layers in original resolution and eight alpha layers downsampled by a factor of two. Option 1 is used for packing.

TABLE 9

| Examples of MPI transmission scenarios for HEVC level 5.x; 8 layers; Option 1 | |
| --- | --- |
| | Example combinations (all examples @ 30 fps) |
| level 5.1 | reduced 720p (8 texture layers, 8 alpha layers downsampled by 2) × 2 views |
| level 5.2 | reduced 720p (8 texture layers, 8 alpha layers downsampled by 2) × 4 views |

Figure 12:
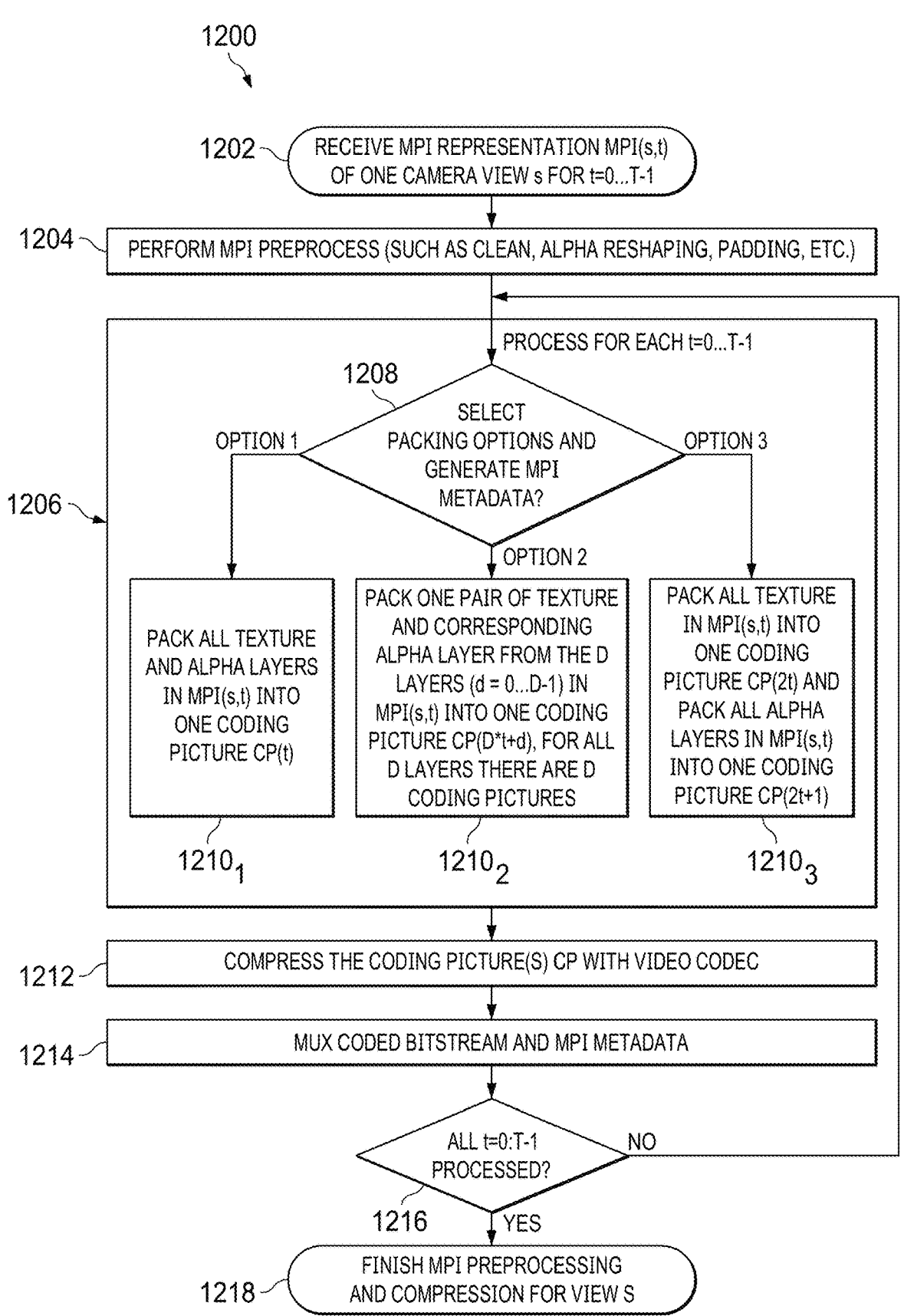
FIG. 12 is a flowchart illustrating an MPI encoding method according to an embodiment.

FIG. 12 is a flowchart illustrating an MPI encoding method (1200) according to an embodiment. The MPI encoding method (1200) can be implemented in the MPI encoder (500) using the above-described Options 1-3. The method (1200) includes receiving the MPI representation MPI (s,t) of one camera view s for times t=0, . . . , T−1 in a block (1202). The received MPI representation is an example of the MPI video (502). The method (1200) also includes performing MPI preprocessing in a block (1204). Operations of the block (1204) can be performed using the pre-processing block (510). The method (1200) further includes option-specific sets of packing operations (12101, 12102, 12103) in a block (1206). A decision block (1208) is used to direct the processing flow of the block (1206) to a selected one of the option-specific sets (12101, 12102, 12103). The packing operations of the set (12101) implement the above-described Option 1. The packing operations of the set (12102) implement the above-described Option 2. The packing operations of the set (12103) implement the above-described Option 3. Operations of the block (1206) can be performed using the packing block (520).

The MPI coding method (1200) also includes video-compression operations in a block (1212). The video-compression operations are applied to the packed 2D video frames generated in the block (1206) and can be performed using the video encoder (530). The MPI coding method (1200) also includes multiplexing the compressed video bitstream and MPI metadata in a block (1212). The multiplexing operations of the block (1212) can be performed using the multiplexer (540). In some examples, e.g., in cases where the MPI metadata is static through the bitstream duration, the metadata are transmitted once, and the block (1212) may be omitted or bypassed. The multiplexing operations of the block (1212) are performed in examples in which the MPI metadata vary from picture to picture. A decision block (1216) of the MPI coding method (1200) controls the exit from the loop (1206, 1212, 1214) at the end of the video sequence. Upon such exit, operations of a final block (1218) are performed and the MPI coding method (1200) is terminated.

FIG. 13 is a flowchart illustrating an MPI decoding method (1300) according to an embodiment. The MPI encoding method (1300) is generally compatible the MPI encoding method (1200) and can be implemented in the MPI decoder (600). The method (1300) includes receiving a bitstream of one camera view s in a block (1302). In some examples, the received bitstream is an example of the coded bitstream (542). A decision block (1304) of the method (1300) is used to determine whether the received bitstream is an MPI video bitstream. Depending on the "No" or "Yes" determination at the decision block (1304), operations of a block (1306) or a block (1308) are performed next. The operations of the block (1306) represent conventional video decoding. In contrast, the operations of the block (1308) belong to a processing loop including blocks (1308-1316) configured to implement MPI video decoding.

The operations of the block (1308) include parsing the MPI metadata. The parsing operations of the block (1308) can be performed using the demultiplexer (640). The parsing operations enable the decoder to get the pertinent MPI information and packing parameters, such as the number (M) of DPB output pictures needed to reconstruct one complete MPI representation, the packing arrangement, the number and depth of layers, post-processing parameters, and camera parameters. As explained above, in some cases, the texture and alpha layers may be temporally interleaved. In such cases, the decoder needs to have readily accessible multiple pictures (video frames) to reconstruct one corresponding multiplane image (200) at a time t. For example, for Option 1 packing, M=1; for Option 2 packing, M=D; for Option 3 packing, M=2.

Operations of the block (1310) include decoding a portion of the bitstream corresponding to the M picture(s) containing the texture and alpha layers needed to reconstruct the image MPI (s,t) at time t. When the bitstream only contains data for a static image for the view s, the decoder operates to decode the whole bitstream. Otherwise, for each time t, the decoder operates to decode the portion of the bitstream that contains output pictures needed to reconstruct the multiplane image (200) representing time t.

Operations of the block (1312) include de-packing and post-processing the texture and alpha layers from the decoded output picture(s) and assembling the layers to reconstruct the image MPI (s,t) at time t. Operations of the block (1314) include performing the view synthesis to render the image I (t) using the image MPI (s,t), the layer depth information, and camera parameters. In various cases, the novel view can be the reference view s itself or an arbitrary virtual view specified by a view input (1313). The decision block (1316) controls the exit from the loop (1308-1314) at the end of the video sequence. Upon such exit, operations of a final block (1318) are performed and the MPI decoding method (1300) is terminated.

In cases in which multiple views are transmitted, the decoder operates to run multiple instances of the method (1300) in parallel. The outputs generated by the respective blocks (1314) of those multiple instances of the method (1300) are fused by computing a weighted sum of those outputs, e.g., as explained above in reference to FIG. 3, during image rendering operations. When the novel view is not stationary, the weights become a function of time, e.g., as explained above in reference to FIG. 4, and are continuously recomputed.

Metadata Design

In this section, we discuss the MPI metadata that are used to properly configure and assist various MPI video decoding operations in various examples and scenarios. As indicated above, the MPI metadata are transmitted by the MPI video encoder (500) via the MPI metadata stream (524). In various examples, the MPI metadata stream (524) may carry one or more of the following categories of metadata:

Basic MPI information:
  Width and height of the reference view;
  Number of MPI layers (D);
  Number of simultaneous views.
Packing/arrangement information:
  packing option: e.g., Option 1, 2, or 3;
  texture/alpha arrangement: side-by-side or top-and-bottom;
  texture layer merging enabled? If yes, then reduction ratio;
  alpha layer downsampling enabled? If yes, then the downsampling factor.
  block based MPI arrangement?
  Texture/alpha, view ID, layer ID, depth of layer for each tile. In some examples, the layer arrangement order can be the implicit order from farthest to nearest against the reference view, or vice versa. In some other examples, the layer arrangement order can be explicitly signaled.
  Packing/transmission of the original reference image.
MPI pre-processing related:
  Adaptive layer merging used? If yes, then the output depth of each layer (quantized with precision);
  Texture/Alpha channel dynamic range adjustment used? If yes, then the adjustment method (linear stretching, nonlinear reshaping, etc.) and the corresponding parameters.
MPI post-processing related:
  Alpha normalization after decoding?
  If block-based MPI is used, then the parameters needed to configure boundary artifacts reduction/mitigation.
Camera and reference view related metadata: (intrinsic/extrinsic matrices, field of view, depth, etc.). This category of metadata may typically be used for the novel view synthesis. However, in some cases, this category may be optional.

For illustration purposes and without any implied limitations, syntax examples are presented for the categories of 1) basic MPI information, 2) packing/arrangement information, and 3) MPI pre-processing information. Based on the provided examples, a person of ordinary skill in the pertinent art will readily understand how to handle the remaining of the above-listed categories of metadata. In addition, for camera related information, the MPEG Immersive video (MIV) specification describes examples of the syntax for both camera extrinsic syntax (section 8.3.2.6.6) and camera intrinsic syntax (section 8.3.2.6.7). The Versatile Supplemental Enhancement Information (VSEI) describes examples of the multiview acquisition information SEI (MAI SEI) message, which contains intrinsic and extrinsic parameters for perspective projection. In some examples, such SEI messages are adapted to describe the camera information. The following corresponding documents are incorporated herein by reference in their entirety: (1) ISO/IEC 23090-12: Information technology—Coded representation of immersive media—Part 12: MPEG Immersive video; and (2) H.274: VSEI; ITU-T.H.274, Versatile supplemental enhancement information messages for coded video bit-streams (08/2020).

For depth-related information, VSEI contains the Depth representation information SEI message. In this Depth representation information SEI message, there is an element depth_rep_info_element (OutSign, OutExp, OutMantissa, OutManLen). In some examples, we reuse this element for MPI metadata purposes to signal the depth information. An example of the corresponding syntax is as follows:

TABLE 10

Definition of depth_rep_info_element( )

| | Descriptor |
|---|---|
| depth_rep_info_element( OutSign, OutExp, OutMantissa, OutManLen ) { | |
|   da_sign_flag | u(1) |
|   da_exponent | u(7) |
|   da_mantissa_len_minus1 | u(5) |
|   da_mantissa | u(v) |
| } | |

FIGS. 14A-14B show an example syntax of a SEI message (1400) configured to convey MPI metadata according to some examples. The SEI message (1400) is configured to cover the MPI information before the packing operations and includes basic MPI information (category 1) and MPI pre-processing information (category 3). The semantics of the SEI message (1400) is described as follows:

SEI. The variables in the x column of Table 11 are derived from the respective variables in the s, e, n, and v columns of Table 11 as follows:

If the value of e is in the range of 0 to 127, exclusive of 0, x is set equal to $(-1)^s*2^{e-31}*(1+n\infty2^v)$.

Otherwise (e is equal to 0), x is set equal to $(-1)^s*2^{-(30+v)}*n$.

TABLE 11

| Association between depth parameter variables and syntax elements | | | | |
|---|---|---|---|---|
| x | s | e | n | v |
| ZNear[ i ] | ZNearSign[ i ] | ZNearExp[ i ] | ZNearMantissa[ i ] | ZNearManLen[ i ] |
| ZFar[ i ] | ZFarSign[ i ] | ZFarExp[ i ] | ZFarMantissa[ i ] | ZFarManLen[ i ] |
| Z[ i ][ j ] | ZSign[ i ][ j ] | ZExp[ i ][ j ] | ZMantissa[ i ][ j ] | ZManLen[ i ][ j ] | mpi_is_one_view_among_multiple_flag equal to 1 indicates that only one camera view exists in the camera setup. mpi_is_one_view_among_multiple_flag equal to 0 indicates that more than one camera views exist in the camera setup.

mpi_view_id specifies the view identifier of the current camera view.

Note: mpi_view_id is used to identify the camera parameters for multiview cameras setup in multiview acquisition information SEI message.

mpi_layer_width_in_luma_samples specifies the width, in units of luma samples, for the original mpi texture and alpha mapping layer.

mpi_layer_height_in_luma_samples specifies the height, in units of luma samples, for the original mpi texture and alpha mapping layer.

Note: this is one example way to signal cropped decoded MPI layer size. Another way is to signal cropping window offsets.

mpi_log 2_ctu_size_minus5 plus 5 specifies the luma coding tree block size of each CTU. Note: this value is a hint to tell what padding is used to enable tiles for MPI layers.

mpi_bit_depth_texture_minus8 plus 8 specifies the bit depth of the samples of the luma and chroma arrays for the texture layers.

mpi_bit_depth_alpha_minus4 plus 4 specifies the bit depth of the samples of the luma arrays for the alpha map layers.

mpi_num_layers_minus1 plus 1 specifies the number of texture and opacity layers for MPI scene representation.

mpi_num_regions_minus1 plus 1 specifies the number of regions for texture and opacity layers for MPI scene representation.

num_region_rows_minus1 plus 1 specifies the number of region rows.

num_region_cols_minus1 plus 1 specifies the number of region columns.

mpi_depth_equal_distance_flag[i] equal to 1 indicates the equal distance is used to generate MPI layers and depth parameter for each layer in i-th region. Z[i][j] can be derive using nearest depth value ZNear [i] and farthest depth value ZFar[i].

Notes: The depth value for the i-th MPI layer in the j-th region is given by $Z[i][j]=j*(ZFar[i]-ZNear[i])/(mpi\_num\_layers\_minus1)+ZNear[i]$. mpi_layer_depth_equal_distance_flag equal to 0 indicates the depth information for each layer in i-th region follow next in mpi_alpha_mapping_flag[i] equal to 1 specifies reshaping is applied to alpha map in the $i^{th}$ region. mpi_alpha_mapping_flag[i] equal to 0 specifies reshaping is not applied to alpha map in the $i^{th}$ region.

alpha_quant_precision_minus11[i] plus 11 specifies the precision to quantize maximum alpha map values for the $i^{th}$ region.

max_alpha[i][j] specifies the maximum alpha value in the j-th MPI layer of i-th region.

Note: in some examples, the following syntax and semantics may be moved to the MPI packing information SEI (see FIG. 15).

mpi_texture_layer_merge_flag equal to 1 specifies texture layers are merged. mpi_texture_layer_merge_flag equal to 0 specifies texture layers are not merged.

log 2_mpi_num_layers_in_one_merged_texture_layer_minus1 plus 1 specifies the number of texture layers in one merged texture layer.

mpi_layer_id_in_one_merged_texture_layer [i][j] specifies the texture layer id for the j-th layer in the i-th merged texture layer.

FIG. 15 shows an example syntax of a SEI message (1500) configured to convey MPI metadata according to some examples. The SEI message (1500) is configured to cover MPI packing. In some examples, Option 1 or Option 3 is preferred, e.g., due to the afforded flexibility and more straightforward implementation. As such, the example shown in FIG. 15 covers Option 1 and Option 3 for illustration purposes. In addition, the alpha map can be scaled, and texture layers can be merged in Option 1. The SEI message (1500) is configured for one camera view and assumes that texture is processed before the alpha map. The semantics of the SEI message (1500) is described as follows:

mpi_arrangement_type equal to 0 indicates spatial arrangement of frame 0 and frame 1 is applied. mpi_arrangement_type equal to 1 indicates temporal interleaving of frame 0 and frame 1 is applied.

Notes: For each specified frame packing arrangement scheme, there are two constituent frames that are referred to as frame 0 and frame 1, with the frame 0 being associated with the spatially packed texture image and the frame 1 being associated with the spatially packed alpha map image. When mpi_arrangement_type is equal to 0, the constituent frame associated with the upper-left sample of the decoded frame is considered to be the constituent frame 0 and the other constituent frame is considered to be the constituent frame 1. When mpi_arrangement_type is equal to 1, the first decoded frame in the current coded layer video sequence (CLVS) is the constituent frame 0 and the next decoded frame in output order is the constituent frame 1, and the display time of the constituent frame 0 is delayed to coincide with the display time of the constituent frame 1.

mpi_alpha_scale_factor_x_minus1 plus 1 specifies the scale factor for the alpha map in x direction.

mpi_alpha_scale_factor_y_minus1 plus 1 specifies the scale factor for alpha map in the y direction.

mpi_spatial_arrangement_type equal to 0 specifies top-bottom packing arrangement is used for frame 0 and frame 1. mpi_spatial_arrangement_type equal to 1 specifies that side-by-side packing arrangement is used for frame 0 and frame 1.

mpi_num_texture_layers_in_height_minus1 plus 1 specifies the number of spatially packed merged texture layers in height in frame 0.

mpi_num_alpha_layers_in_height_minus1 plus 1 specifies the number of spatially packed alpha layers in height in frame 1.

mpi_num_layers_in_height_minus1 plus 1 specifies the number of spatially packed layers in height for merged texture layers in frame 0 and alpha layers in frame 1.

FIG. 16 shows an example syntax of a SEI message (1600) configured to convey MPI metadata according to additional examples. The SEI message (1600) specifies the MPI scene representation information that may be used for view synthesis. In some examples, the SEI message (1600) can work together with a multiview acquisition information SEI message for view synthesis. The multiview acquisition information SEI message specifies intrinsic and extrinsic parameters for all of the reference camera view. When multiple video bitstreams are available, the reconstructed novel views can be rendered from nearby multiview MPIs.

Table 12 below depicts an example SEI message for MPI messaging according to another embodiment with a simpler syntax structure. Table 12 includes also two new syntax elements: mpi_layer_depth_or_disparity values_flag and mpi_depth_equal_distance_type_flag.

TABLE 12

| Example syntax for an MPI information SEI message | |
|---|---|
| | Descriptor |
| multiplane_image_information( payloadSize ) { | |
|   mpi_num_layers_minus1 | ue(v) |
|   mpi_layer_depth_or_disparity values_flag /* 0:depth values, 1:disparity values*/ | u(1) |
|   mpi_layer_depth_equal_distance_flag /*0:unequal, 1:equal distance layers*/ | u(1) |
|   if( mpi_layer_depth_equal_distance_flag ) { | |
|     mpi_depth_equal_distance_type_flag /* 0: equal depth, 1: equal disparity*/ | u(1) |
|     depth_rep_info_element( ZNearSign, ZNearExp, ZNearMantissa, ZNearManLen ) | |
|     depth_rep_info_element( ZFarSign, ZFarExp, ZFarMantissa, ZFarManLen ) | |
|   } else | |
|     for( i = 0; i <= mpi_num_layer_minus1; i++ ) | |
|       depth_rep_info_element( ZSign[ i ], ZExp[ i ], ZMantissa[ i ], ZManLen[ i ] ) | |
|   mpi_texture_opacity_interleave flag | u(1) |
|   if( mpi_texture_opacity_interleave flag = = 0 ) | |
|     mpi_texture_opacity_arrangement_flag /* 0:Top-to-Bottom, 1:Side-by-Side */ | u(1) |
|   mpi_picture_num_layers_in_height_minus1 | ue(v) |
| } | |

Use of SEI messages (1600) and in Table 12 rely on the definition of the following variables:

Cropped decoded output picture width and height in units of luma samples, denoted herein by CroppedWidth and CroppedHeight, respectively.

A chroma format indicator, denoted herein by ChromaFormatIdc.

A cropped decoded picture array decPicCurr0[cIdx][x][y], with cIdx=0 . . . (ChromaFormatIdc==0)?0:2, x=0 . . . (cIdx==0)? CroppedWidth: CroppedWidth/SubWidthC−1, y=0 . . . (cIdx==0)? CroppedHeight: CroppedHeight/SubHeightC−1.

In output order a temporally following cropped decoded picture array decPicCurr1 [cIdx][x][y], with cIdx=0 . . . (ChromaFormatIdc==0)?0:2, x=0 . . . (cIdx==0)? CroppedWidth: CroppedWidth/SubWidthC−1, y=0 . . . (cIdx==0)? CroppedHeight: CroppedHeight/SubHeightC−1.

The variables Sub WidthC and SubHeightC are derived from ChromaFormatIdc as specified.

The semantics of the SEI message (1600) and the Table 12 message are described as follows:

mpi_cancel_flag equal to 1 indicates that the MPI SEI message cancels the persistence of any previous MPI SEI message in output order that applies to the current layer. mpi_cancel_flag equal to 0 indicates that MPI follows.

mpi_persistence_flag specifies the persistence of the MPI SEI message for the current layer.

mpi_view_id specifies the view identifier of the current camera view.

NOTE: mpi_view_id is used to identify the camera parameters for multiview camera setup in the multiview acquisition information SEI message. The view identifier of the i-th view in the current CVS is equal to ViewId[i] as specified in the semantics of the Scalability Dimension Information (SDI) SEI message, in clause 8.19.2. of ITU-T H.274, (VSEI) (05/2022), incorporated herein by reference.

mpi_num_layers_minus1 plus 1 specifies the number of texture and opacity layers for MPI scene representation.

mpi_layer_depth_or_disparity values_flag equal to 0 indicates the depth information signalled in the MPI SEI message is interpreted as depth values. mpi_layer_depth_or_disparity values_flag equal to 1 indicates the depth information signalled in the SEI message is interpreted as disparity values. The disparity value D and depth value Z relationship is D=1=Z.

mpi_layer_depth_equal_distance_flag equal to 1 indicates the equal distance is used to generate MPI layers and depth parameter for each layer $Z[i]$ can be derived using nearest depth value ZNear and farthest depth value ZFar. Alternatively, the disparity parameter for each layer $D[i]$ can be derived using disparity value DNear and disparity value DFar.

mpi_depth_equal_distance_type_flag equal to 0 indicates depth values have equal distance in depth. mpi_depth_equal_distance_type_flag equal to 1 indicates depth values have equal distance in disparity.

- If mpi_layer_depth_or _disparity values_flag is equal to 0 and mpi_depth_equal_distance_type_flag is equal to 0, then:

the depth value $Z[$ mpi_num_layers_minus1 − i $] = i * ($ ZFar − ZNear $) \div ($ mpi_num_layers_minus1 $) +$ ZNear, (m1)

and the disparity value $D[ i ] = 1 \div Z[ i ]$. (m2)

- If mpi_layer_depth_or_disparity values_flag is equal to 0 and mpi_depth_equal_distance_type_flag is equal to 1, then:

the depth value $Z[ i ] =$ $1 \div ( i * ( 1 \div$ ZNear − 1 $\div$ ZFar $) \div ($ mpi_num_layers_minus1 $) + 1 \div$ ZFar $)$, (m3)

and the disparity value $D[ i ] = 1 \div Z[ i ]$. (m4)

- If mpi_layer_depth_or _disparity values_flag is equal to 1 and mpi_depth_equal_distance_type_flag is equal to 0, then the disparity value $D[$ mpi_num_layers_minus1 − i $] =$ $1 \div ( i * ( 1 \div$ DFar − 1 $\div$ DNear $) \div ($ mpi_num_layers_minus1 $) + 1 \div$ DNear $)$, (m5)

and the depth value $Z[ i ] = 1 \div D[ i ]$. (m6)

- If mpi_layer_depth_or _disparity values_flag is equal to 1 and mpi_depth_equal_distance_type_flag is equal to 1, then:

the disparity value $D[ i ] = i * ($ DNear − DFar $) \div ($ mpi_num_layers_minus1 $) +$ DFar, (m7)

and the depth value $Z[ i ] = 1 \div D[ i ]$. (m8)

mpi_persistence_flag equal to 0 specifies that the MPI SEI message applies to the current decoded picture only.

mpi_persistence_flag equal to 1 specifies that the MPI SEI message applies to the current decoded picture and persists for all subsequent pictures of the current layer in output order until one or more of the following conditions are true:

A new CLVS of the current layer begins.

The bitstream ends.

A picture in the current layer in an AU associated with an MPI SEI message is output that follows the current picture in output order.

mpi_layer_depth_equal_distance_flag equal to 0 indicates that the depth information for each layer follows next in the SEI message. The layer index 0 is associated with the layer having the farthest depth value or the smallest disparity value. The layer index mpi_num_layers_minus1 is associated with the layer having the nearest depth value or the biggest disparity value. The depth value $Z[i]$ or disparity value $D[i]$ should be monotonic.

The variables ZNear, ZFar, and $Z[i]$ are derived from the respective variables in the s, e, n and v columns of Table 11 as indicated above.

Note: in some applications, disparity is used instead of depth (Disparity value D and depth value Z relationship is D=1/Z).

mpi_texture_opacity_interleave_flag equal to 1 indicates the component planes of the output cropped decoded pictures in output order form a temporal interleaving of alternating first and second constituent frames as illustrated in FIG. 10.

mpi_texture_opacity_arrangement_flag identifies the indicated interpretation of the sample arrays of the output cropped decoded picture as specified in Table 13.

TABLE 13

Definition of mpi_texture_opacity_arrangement_flag

| Value | Interpretation |
|---|---|
| 0 | The mpi texture opacity information structure contains a top-bottom packing arrangement of corresponding planes of two constituent frames. |
| 1 | The mpi texture opacity packing arrangement structure contains a side-by-side packing arrangement of corresponding planes of two constituent frames, e.g., as shown in FIG. 8. |

For each specified frame packing arrangement scheme, there are two constituent frames that are referred to as frame 0 and frame 1. When mpi_texture_opacity_interleave_flag is equal to 0, the constituent frame associated with the upper-left sample of the decoded frame is considered to be the constituent frame 0 and the other constituent frame is considered to be the constituent frame 1. When mpi_texture_opacity_interleave_flag is equal to 1, the first decoded frame in current CLVS is the constituent frame 0, and the next decoded frame in output order is the constituent frame 1. The display time of the constituent frame 0 is delayed to coincide with the display time of the constituent frame 1. The two constituent frames form the spatially packed texture and opacity image of an MPI, with the frame 0 being associated with the spatially packed texture image, and the frame 1 being associated with the spatially packed opacity image.

mpi_frame_num_layers_minus1_in_height plus 1 specifies the number of spatially packed layers in height for frame 0 and frame 1. The number of spatially packed layers in width for frame 0 and frame 1 is set equal to (mpi_num_layers_minus1+1) divided by (mpi_frame_num_layers_minus1_in_height+1).

Let the variable hLayers and wLayers be the number of spatially packed layers in height and the number of spatially packed layers in width.

mpi_layer_crop_window_flag equal to 1 indicates that the texture and opacity layer cropping window offset parameters follow next in the SEI. mpi_layer_crop_window_flag equal to 0 indicates that the texture and opacity layer crop window parameters are not present in the SEI.

mpi_layer_crop_win_left_offset, mpi_layer_crop_win_right_offset, mpi_layer_crop_win_top_offset, mpi_layer_crop_win_bottom_offset specify the cropping window is applied to pictures with the offset values of left, right, top, and bottom in units of luma samples of each decoded MPI texture and opacity layer. When mpi_layer_crop_win_flag is equal to 0, the values of mpi_layer_crop_win_left_offset, mpi_layer_crop_win_right_offset, mpi_layer_crop_win_top_offset, mpi_layer_crop_win_bottom_offset are inferred to be 0. Let variable layerWidth and layerHeight specifies the width and height for decoded MPI layer, respectively.

```
If mpi_texture_opacity_interleave_flag is equal to 1
-    layer Width = Cropped Width / wLayers, layerHeight = CroppedHeight / hLayers
else
    If mpi_texture_opacity_arrangement_flag is equal to 0, the following applies:
    - layerWidth = CroppedWidth / wLayers, layerHeight = CroppedHeight / ( hLayers * 2 )
    else if mpi_texture_opacity_arrangement_flag is equal to 1, the following applies:
    - layerWidth = CroppedWidth / ( wLayers * 2 ), layerHeight = CroppedHeight / ( hLayers )
```

The cropping window for the i-th MPI texture layer is specified in frame 0 and the cropping window for the i-th opacity layer is specified in frame 1 for any i in the range of 0 to mpi_num_layers_minus1.

Let variable k=i % wLayers and m=(i−k)/hLayers, respectively.

The cropping window for the i-th MPI layer contains the luma samples with horizontal picture coordinates from k*layerWidth+SubWidthC*mpi_layer_crop_win_left_offset to (k+1)*layerWidth−(SubWidthC*mpi_layer_crop_win_right_offset+1) and vertical picture coordinates from m*layerHeight+SubHeightC*mpi_layer_crop_win_top_offset to (m+1)*layerHeight−(SubHeightC*mpi_layer_crop_win_bottom_offset+1), inclusive. When ChromaFormatIdc is not equal to 0, the corresponding specified samples of the two chroma arrays are the samples having picture coordinates (x/SubWidthC, y/SubHeightC), where (x, y) are the picture coordinates of the specified luma samples.

In another example, consider the following the semantics:

mpi_picture_num_layers_minus1_in_height plus 1 specifies the number of spatially packed layers in height for picture 0 and picture 1. The variable hLayers is set equal to mpi_picture_num_layers_minus1_in_height+1 and the variable wLayers is set equal to (mpi_num_layers_minus1+1)/hLayers.

Let variables fWidth and fHeight specify the width and height of picture 0 and picture 1 respectively and derived as follows:

- If mpi_texture_opacity_interleave_flag is equal to 1, the following applies:
  fWidth = CroppedWidth
  fHeight = CroppedHeight
- Otherwise (mpi_texture_opacity_interleave_flag is equal to 0)
  - If mpi_texture_opacity_arrangement_flag is equal to 0, the following applies:
    fWidth = CroppedWidth , fHeight = CroppedHeight / 2
  - Otherwise (mpi_texture_opacity_arrangement_flag is equal to 1), the following applies:
    fWidth = CroppedWidth / 2 , fHeight = CroppedHeight Let variable cWidth=fWidth/subWidthC and variable cHeight=fHeight/subHeightC. Let array picture0[cIdx][x][y] specify samples in picture 0 and array picture1[cIdx][x][y] specify samples in picture 1, with cIdx=0 . . . (ChromaFormatIdc==0)?0:2, x=0 . . . (cIdx==0)? fWidth: cWidth−1, y=0 . . . (cIdx==0)? fHeight: cHeight−1 and are derived as follows:

- If mpi_texture_opacity_interleave_flag is equal to 1, the following applies:
  picture0[ cIdx ][ x ][ y ] = decPicCurr0[ cIdx ][ x ][ y ]
  picture1[ cIdx ][ x ][ y ] = decPicCurr1[ cIdx ][ x ][ y ]
- Otherwise (mpi_texture_opacity_interleave_flag is equal to 0)
  - Let variable cW = (cIdx = = 0 )? fWidth : cWidth
  - Let variable cH = (cIdx = = 0 )? fHeight : cHeight
  - If mpi_texture_opacity_arrangement_flag is equal to 0, the following applies:
    picture0[ cIdx ][ x ][ y ] = decPicCurr0[ cIdx ][ x ][ y ]
    picture1[ cIdx ][ x ][ y ] = decPicCurr0[ cIdx ][ x ][ y + cH ]
  - Otherwise (mpi_texture_opacity_arrangement_flag is equal to 1), the following applies:
    picture0[ cIdx ][ x ][ y ] = decPicCurr0[ cIdx ][ x ][ y ]
    picture1[ cIdx ][ x ][ y ] = decPicCurr0[ cIdx ][ x + cW ][ y ]

Let variable layerWidth and layerHeight specify the width and height for decoded MPI layer respectively. The variables are derived as follows:
layerWidth=fWidth/wLayers
layerHeight=fHeight/hLayers
In an embodiment, an example of the MPI reconstruction process is described as follows: The outputs of this process are:

- a 4D mpi texture layer array recTextureLayer[ i ][ cIdx ][ w ][ h ] with i = 0..mpi_num_layers_minus1, cIdx = 0..(ChromaFormatIdc = = 0 ) ? 0 : 2, w = 0..(cIdx = = 0 ) ? layerWidth : layerWidth / SubWidthC − 1, and h = 0..(cIdx = = 0 ) ? layerHeight : layerHeight / SubHeightC − 1.

- a 3D mpi opacity layer array recOpacityLayer[ i ][ w ][ h ] with i = 0..mpi_num_layers_minus1, x = 0..layerWidth − 1, and y = 0..layerHeight − 1.

The array recTextureLayer and array recOpacityLayer are derived as follows:

```
for( i = 0; i <= mpi_num_layers_minus1; i++ ) {
k = i % wLayers
m = ( i − k ) / hLayers
for ( cIdx = 0; cIdx < ChromaFormatIdc = = 0 ) ? 1 : 3; cIdx++ )
    for( h = 0; h < (cIdx = = 0 ) ? layerHeight : layerHeight / SubHeightC ; h++ )
for( w = 0; w < (cIdx = = 0 ) ? layerWidth : layerWidth / SubWidthC ; w++ ) {
        u = k * (cIdx = = 0 ) ? layerWidth : layerWidth / SubWidthC + w
        v = m * (cIdx = = 0 ) ? layerHeight : layerHeight / SubHeightC + h
        recTextureLayer[ i ][ cIdx ][ w ][ h ] = picture0[ cIdx ][ u ][ v ]
    }
for( h = 0; h < layerHeight; h++ )
    for( w = 0; w < layerWidth ; w++ )
recOpacityLayer[ i ][ w ][ h ] = picture1[ 0 ][ k * layerWidth + w ][ m * layerHeight + h ]
}
```

In various additional examples, other suitable syntaxes can similarly be used. In some examples, a syntax enabling the coverage of both the MPI scene information and the MPI packing information is used.

VUI Signaling Considerations

Since the packed MPI format is not intended to be directly viewed by the final user, signaling is required to inform the playback device on this sub-optimal viewing information. One method is to overload the vui_non_packed_constraint_flag semantics. Using Italics for the added syntax, the revised semantics is as follows:

vui_non_packed_constraint_flag equal to 1 specifies that there shall not be any frame packing arrangement SEI messages, or be any MPI information SEI present in the bitstream that apply to the CLVS. *vui_non_packed_constraint_flag equal to 0 does not impose such a constraint.*

Improve Depth Value Coding

As defined earlier, the structure of depth_rep_info_element ( ) in Table 10 is defined as follows:

| | Descriptor |
|---|---|
| depth_rep_info_element(OutSign, OutExp, OutMantissa, OutManLen) { | |
| da_sign_flag | u(1) |
| da_exponent | u(7) |
| da_mantissa_len_minus1 | u(5) |
| da_mantissa | u(v) |
| } | |

The exponent element is always coded using a fixed length of 7 bits.

```
for( i = 0; i < = mpi_num_layer_minus1; i++ )
    depth_rep_info_element( zSign[ i ], zExp[ i ], zMantissa[ i ], zManLen[ i ] )
```

In an example embodiment, modifications (shown in Italics) are proposed as follows:

When one needs to signal an array of these elements (such as, specify in a coding loop the depth values of each layer), one may introduce prediction-based coding to further reduce the bit overhead of the syntax elements in this structure. In one embodiment, one can code the delta value of the element in the loop instead of the absolute value and use variable length coding (such as ue(v), or se(v)) instead of fixed length coding. For example:

```
for( i = 0; i < = mpi_num_layer_minus1; i++ )
    depth_rep_info_element( ZSign[ i ], deltaZExp[ i ], ZMantissa[ i ],
ZManLen[ i ] )
```

| | Descriptor |
|---|---|
| depth_rep_info_element(OutSign, *OutExpDelta*,OutMantissa, OutManLen) { | |
| da_sign_flag | u(1 ) |
| da_exponent_delta | ue(v) |
| da_mantissa_len_minus1 | u(5) |
| da_mantissa | u(v) |
| } | |

In an example implementation shown here, for the given values of a 16 layer depth representation, the bits used to signal the exponent can be reduced from 112 bits to 32 bits using the prediction based method.

| layer | Depth | value of the syntax elements | | | | | bit usage comparison | |
|---|---|---|---|---|---|---|---|---|
| | | | | | | | bits for e | bit for delta |
| id | value | s | e | delta e | n | v | with u(7) | e by ue(v) |
| 0 | 0.046954 | 0 | 26 | 26 | 31 | 1079141113 | 7 | 9 |
| 1 | 0.106744 | 0 | 27 | 1 | 32 | −1254534521 | 7 | 3 |
| 2 | 0.165213 | 0 | 28 | 1 | 32 | 1381692009 | 7 | 3 |
| 3 | 0.220812 | 0 | 28 | 0 | 31 | 1646030067 | 7 | 1 |
| 4 | 0.274312 | 0 | 29 | 1 | 29 | 52208699 | 7 | 3 |
| 5 | 0.325397 | 0 | 29 | 0 | 32 | 1295313345 | 7 | 1 |
| 6 | 0.373619 | 0 | 29 | 0 | 22 | 2073983 | 7 | 1 |
| 7 | 0.41761 | 0 | 29 | 0 | 31 | 1439756789 | 7 | 1 |
| 8 | 0.458456 | 0 | 29 | 0 | 32 | −713726499 | 7 | 1 |
| 9 | 0.500442 | 0 | 30 | 1 | 31 | 1899535 | 7 | 3 |
| 10 | 0.548034 | 0 | 30 | 0 | 32 | 412604623 | 7 | 1 |
| 11 | 0.599967 | 0 | 30 | 0 | 32 | 858707929 | 7 | 1 |
| 12 | 0.656207 | 0 | 30 | 0 | 31 | 670904815 | 7 | 1 |
| 13 | 0.716573 | 0 | 30 | 0 | 31 | 930173093 | 7 | 1 |
| 14 | 0.787216 | 0 | 30 | 0 | 30 | 616791019 | 7 | 1 |
| 15 | 0.880064 | 0 | 30 | 0 | 31 | 1632361591 | 7 | 1 |
| | | | | | | tot. bits | 112 | 32 |

MPI Transmission in MIV Coding Standard

The MPEG Immersive Video (MIV) specification (ISO/IEC 23090-12: 2021 (E)/AMD.1:2022, Information technology-Coded representation of immersive media Part 12: MPEG Immersive video) is an extension of the V3C specification (ISO/IEC 23090-5: 2023 (E), Information technology-Coded representation of immersive media-Part 5: Visual volumetric video-based coding (V3C) and video-based point cloud compression (V-PCC)), wherein both specifications are incorporated herein by reference in their entirety, defines a profile called "MIV Extended Restricted Geometry Profile" that aims at the distribution of MPI/MSI content. MPI/MSI videos are associated with only texture and transparency attributes. It is expected that the two attributes are either carried in two independent V3C_AVD units, or they are being frame-packed and carried in one V3C_PVD unit. In the first case, two independent elemental video decoders (e.g., HEVC, VVC, and the like) are used to decode the multiplexed MIV bitstream consisting of one atlas sub-stream and two video sub-streams. In the latter case, one 2D conventional video decoder is used to decode the frame-packed attributes. However, the current profile definition in Table A-1 of the MIV specification, as shown in the Appendix, does not seem to support the latter case. As used in V3C, the term "atlas" denotes "a collection of 2D bounding boxes and their associated information placed onto a rectangular frame and corresponding to a volume in 3D space on which volumetric data is rendered."

Table 16A depicts an example of a proposed revised MIV Table A-1 which provides some example edits to the existing MIV Extended Restricted Geometry profile and proposes also a new MIV Extended Restricted Geometry Packed profile to properly support both the two-stream case and the one-stream (Packed) case. The suggested modifications, where Italic text indicates suggested changes to existing syntax parameters, and Italic bold text indicates new additions, of MIV Table A-1 are:

1) Add a column to define a new "MIV Extended Restricted Geometry Packed" profile to support MPI with frame packing.
2) Add vps_attribute_video_present_flag[atlasID] in the syntax element column and set its value properly for the two MPI profiles.
3) Add pin attribute syntax elements and set proper values for the packed MPI packed profile.
4) Set proper values to original syntax elements.

TABLE 16A

| Example of a modified MIV Table A-1 with MIV Extended Restricted Geometry Packed Profile | | |
|---|---|---|
| | Profiles | |
| Syntax element | MIV Extended Restricted Geometry | *MIV Extended Restricted Geometry Packed* |
| *vuh_unit_type* | V3C_VPS, V3C_AD, V3C_AVD, ~~V3C_PVD,~~ or V3C CAD | V3C_VPS, V3C_AD, V3C_PVD, or V3C CAD |
| ptl_profile_toolset_idc | 65 | 65 |
| ptl_profile_reconstruction_idc | 255 | 255 |
| ptc_restricted_geometry_flag | 1 | 1 |

TABLE 16A-continued

Example of a modified MIV Table A-1 with MIV Extended Restricted Geometry Packed Profile

| | Profiles | |
| Syntax element | MIV Extended Restricted Geometry | *MIV Extended Restricted Geometry Packed* |
| --- | --- | --- |
| VpsMivExtensionPresentFlag | 1 | 1 |
| *VpsPackingInformationPresentFlag* | 0,~~1~~ | 1 |
| vps_map_count_minus1[ atlasID ] | 0 | 0 |
| vps_occupancy_video_present_flag[ atlasID ] | 0 | 0 |
| vps_geometry_video_present_flag[ atlasID ] | 0 | 0 |
| *vps_attribute_video_present_flag[atlasID ]* | 1 | 0 |
| *pin_attribute_present_flag[atlasID ]* | — | 1 |
| vme_embedded_occupancy_enabled_flag | 0 | 0 |
| gi_geometry_MSB_align_flag[ atlasID ] | 0 | 0 |
| *ai_attribute_count[ atlasID ]* | 2 | — |
| *pin_attribute_count[atlasID ]* | — | 2 |
| *ai_attribute_type_id[ atlasID ][ attrIdx ]* | ATTR_TEXTURE, ATTR_TRANSPARENCY | — |
| *pin_attribute_type_id[atlasID ][attrIdx ]* | — | ATTR_TEXTURE, ATTR_TRANSPARENCY |
| *ai_attribute_dimension_minus1[ atlasID ][ attrTextureIdx ]* | 2 | — |
| *pin_attribute_dimension_minus1[atlasID ][ attrTextureIdx ]* | — | 2 |
| *ai_attribute_dimension_minus1[ atlasID ][ attrTransparencyIdx ]* | 0 | — |
| *pin_attribute_dimension_minus1[atlasID ][ attrTransparencyIdx ]* | — | 0 |
| *ai_attribute_dimension_partitions_minus1[ atlasID ][ attrIdx ]* | 0 | — |
| *pin_attribute_dimension_partitions_minus1[ atlasID ][attrIdx ]* | — | 0 |
| *ai_attribute_MSB_align_flag[ atlasID ][ attrIdx ]* | 0 | — |
| *pin_attribute_MSB_align_flag[ atlasID ][attrIdx ]* | — | 0 |
| asps_long_term_ref_atlas_frames_flag | 0 | 0 |
| asps_pixel_deinterleaving_enabled_flag | 0 | 0 |
| asps_patch_precedence_order_flag | 0 | 0 |
| asps_raw_patch_enabled_flag | 0 | 0 |
| asps_com_patch_enabled_flag | 0 | 0 |
| asps_plr_enabled_flag | 0 | 0 |
| asme_patch_constant_depth_flag | 1 | 1 |
| vps_geometry_video_present_flag[ atlasID ] \|\| asme_patch_constant_depth_flag | 1 | 1 |
| *vps_packed_video_present_flag[ atlasID ]* | 0,~~1~~ | 1 |
| . . . | . . . | . . . |

A copy of the description of the edited and new semantics from the V3C specification is provided in the Appendix.

Proposed MIV "Simple MPI" Profile

In another embodiment, to support the proposed MPI streaming with a single decoder and with reduced decoder complexity over the one needed to support existing MIV Profiles, thus allowing for broader commercial adoption of MPI-based streaming, it is proposed to draft a new MIV "Simple MPI" Profile with the following constraints.

ptl_profile_toolset_idc=68

Note: Using 68 is just an example indicating the new MIV profile.

To enable to decode an MPI video with a single video decoder, there is a single atlas with a single tile, with texture and transparency packed into a single video. This implies:

ptl_max_decodes_idc=0 (Single decoder)

To indicate the presence of packed video containing texture and transparency, without occupancy and geometry, then:

vps_packed_video_present_flag[atlasID]=1
pin_attribute_present_flag[atlasID]=1
pin_attribute_count[atlasID]=2
pin_attribute_type_id[atlasID][0]=ATTR_TEXTURE
pin_attribute_type_id[atlasID][1]=ATTR_TRANSPARENCY
to indicate the absence of occupancy
vps_occupancy_video_present_flag[atlasID]=0
pin_occupancy_present_flag[atlasID]=0
vme_embedded_occupancy_enabled_flag=0
to indicate the absence of geometry
vps_geometry_video_present_flag[atlasID]=0
pin_geometry_present_flag[atlasID]=0
and, to disable the scaling of geometry and occupancy
vme_geometry_scale_enabled_flag=0
vme_occupancy_scale_enabled_flag=0
asme_occupancy_scale_enabled_flag=0
To indicate a single MPI view
mvp_num_views_minus1=0
To indicate a single atlas with a single tile
vps_atlas_count_minus1[atlasID]=0 (single atlas)

gm_group_count=1 (single atlas group)
afti_single_tile_in_atlas_frame_flag=1 (a single atlas with a single tile)

To lower the complexity of patch-based reconstruction by reducing the number of patches, one may map one patch per MPI layer by setting patch width and height as equal to width and height of the camera projection plane, and require full layers (that is, not even cropped layers), for all p (where p denotes a patch index), and v (where denotes a view identifier). Since all patches are generated for a single camera view, typically, but without limitation, v=0. Thus:

AtlasPatch2dSizeX[p]=ci_projection_plane_width_minus1[v]+1 (patch width is equal to camera projection plane width)

AtlasPatch2DsizeY[p]=ci_projection_plane_height_minus1[v]+1 (patch height is equal to camera projection height)

for camera view v: pdu_projection_id[tile ID][p]=mvp_view_id[v], for all p (all patches are generated for a single MPI camera view)

To require one patch per layer:

Pdu3dOffsetD[tileID][p]!=Pdu3dOffsetD[tileID][q] for all p!=q

Table 16B depicts an example of a proposed revised MIV Table A-1 which provides some example edits to the existing MIV Extended Restricted Geometry profile and proposes also the new Simple MPI profile. As in Table 16A, the suggested modifications, are shown in Italics or Italic bold.

TABLE 16B

Example of a modified MIV Table A-1 with a new MIV Simple MPI Profile

| Syntax element | Profiles | |
| --- | --- | --- |
| | MIV Extended Restricted Geometry | *Simple MPI profile* |
| *vuh_unit_type* | V3C_VPS, V3C_AD, V3C_AVD, ~~V3C_PVD,~~ or V3C CAD | V3C_VPS, V3C_AD, V3C_PVD, or V3C CAD |
| ptl_profile_toolset_idc | 65 | 68 |
| ptl_profile_reconstruction_idc | 255 | 255 |
| ptc_restricted_geometry_flag | 1 | 1 |
| ptl_max_decodes_idc | | 0 |
| VpsMivExtensionPresentFlag | 1 | 1 |
| VpsMiv2ExtensionPresentFlag | | 0 |
| *VpsPackingInformationPresentFlag* | 0,~~1~~ | 1 |
| vps_atlas_count_minus1[ atlasID ] | | 0 |
| vps_map_count_minus1[ atlasID ] | 0 | 0 |
| vps_occupancy_video_present_flag[ atlasID ] | 0 | 0 |
| vps_geometry_video_present_flag[ atlasID ] | 0 | 0 |
| gm_group_count | | 1 |
| *vps_attribute_video_present_flag[atlasID]* | 1 | 0 |
| *pin_occupancy_present_flag[atlasID]* | | 0 |
| *pin_geometry_present_flag[atlasID]* | | 0 |
| *pin_attribute_present_flag[atlasID]* | — | 1 |
| vme_geometry_scale_enabled_flag | | 0 |
| vme_embedded_occupancy_enabled_flag | 0 | 0 |
| vme_occupancy_scale_enabled_flag | | 0 |
| gi_geometry_MSB_align_flag[ atlasID ] | 0 | |
| *ai_attribute_count[ atlasID ]* | 2 | — |
| *pin_attribute_count[atlasID]* | — | 2 |
| *ai_attribute_type_id[ atlasID ][ attrIdx ]* | ATTR_TEXTURE, ATTR_TRANSPARENCY | — |
| *pin_attribute_type_id[atlasID ][attrIdx ]* | — | |
| pin_attribute_type_id[ atlasID ][ 0 ] | | ATTR_TEXTURE, |
| pin_attribute_type_id[ atlasID ][ 1 ] | | ATTR_TRANSPARENCY |
| *ai_attribute_dimension_minus1[ atlasID ][ attrTextureIdx ]* | 2 | — |
| *pin_attribute_dimension_minus1[atlasID ][ attrTextureIdx ]* | — | 2 |
| *ai_attribute_dimension_minus1[ atlasID ][ attrTransparencyIdx ]* | 0 | — |
| *pin_attribute_dimension_minus1[atlasID ][ attrTransparencyIdx ]* | — | 0 |
| *ai_attribute_dimension_partitions_minus1[ atlasID ][ attrIdx ]* | 0 | — |
| *pin_attribute_dimension_partitions_minus1[ atlasID ][attrIdx ]* | — | 0 |
| *ai_attribute_MSB_align_flag[ atlasID ][ attrIdx ]* | 0 | — |
| *pin_attribute_MSB_align_flag[atlasID ][attrIdx ]* | — | 0 |
| casps_miv_2_extension_present_flag | | 0 |
| asps_miv_2_extension_present_flag | | 0 |
| asps_long_term_ref_atlas_frames_flag | 0 | 0 |
| asps_pixel_deinterleaving_enabled_flag | 0 | 0 |
| asps_patch_precedence_order_flag | 0 | 0 |
| asps_raw_patch_enabled_flag | 0 | 0 |
| asps_com_patch_enabled_flag | 0 | 0 |
| asps_plr_enabled_flag | 0 | 0 |

TABLE 16B-continued

Example of a modified MIV Table A-1 with a new MIV Simple MPI Profile

| | Profiles | |
| --- | --- | --- |
| Syntax element | MIV Extended Restricted Geometry | *Simple MPI profile* |
| asme_patch_constant_depth_flag | 1 | 1 |
| asme_occupancy_scale_enabled_flag | | 0 |
| afps_lod_mode_enabled_flag | | 0 |
| afps_raw_3d_offset_bit_count_explicit_mode_flag | | 0 |
| afti_single_tile_in_atlas_frame_flag | | 1 |
| vps_geometry_video_present_flag[ atlasID ] \|\| | 1 | vps_geometry_video_present-_flag[ |
| asme_patch_constant_depth_flag | | atlasID ]= 0 |
| | | pin_geometry_present_flag[ atlasID ]= 0 |
| | | asme_patch_constant_depth-_flag = 1 |
| *vps_packed_video_present_flag[ atlasID ]* | 0,~~1~~ | 1 |
| mvp_num_views_minus1 | | 0 |
| ath_type | | I_TILE |
| atdu_patch_mode[ tileID ][ patchIdx ] | | I_INTRA |
| aaps_vpcc_extension_present_flag | | 0 |
| AtlasPatch2dSizeX[ p ] | | Specified below |
| AtlasPatch2dSizeY[ p ] | | Specified below |

The following restrictions apply to a bitstream conforming to the MIV simple MPI toolset profile component:

AtlasPatch2dSizeX[p] shall be equal to ci_projection_plane_width_minus1[v]+1, for v such that pdu_projection_id[tileID][p]=mvp_view_id[v]

AtlasPatch2DsizeY[p] shall be equal to ci_projection_plane_height_minus1[v]+1, for v such that pdu_projection_id[tileID][p]=mvp_view_id[v].

NOTE—The MIV simple MPI toolset profile component is restricted to map each full layer to a single patch in a single atlas frame.

MIV Metadata for MPI Information

When MPI video is encoded according to the MIV coding standard, it requires to generate the atlas data containing patches of information. Each patch contains a 2D bounding box, and its associated information is placed onto a rectangular frame corresponding to a volume in 3D space. As a result, since redundant patch information may be repeated, for a large number of patches the atlas data size increases. Since constant patch information can be applied across MPI layers, a novel method to reduce atlas data size is proposed. In an embodiment on may add a new flag (asps_patch_constant_flag) to indicate that the same width, height, and patch mode are applied to all patches syntax elements in atlas_sequence_parameter_set_rbsp( ) For example.

| | Descriptor |
| --- | --- |
| atlas_sequence_parameter_set_rbsp( ) { | |
| .... | u(5) |
| *asps_patch_constant_flag* | u(1) |
| ... | ue(v) |
| } | | asps_patch_constant_flag equal to 1 specifies that constraints which are present in atlas tile header, i.e., patch mode, width and height, are applied for all patches for the current atlas.

asps_patch_constant_flag equal to 0 specifies that each patch may have different constraints, e.g., width and height, for the current atlas.

Consider atlas_tile_layer_rbsp( ) defined as:

| | Descriptor |
| --- | --- |
| atlas_tile_layer_rbsp( ) { | |
| atlas_tile_header( ) | |
| atlas_tile_data_unit( ath_id ) | |
| rbsp_trailing_bits( ) | |
| } | | then, in an embodiment, examples of new proposed syntax elements in atlas_tile_header( ) and atlas_tile_data_unit( ) shown in the next two Tables in Italics, can be defined as follows.

For atlas_tile_header( )

| | Descriptor |
| --- | --- |
| atlas_tile_header( ) { | |
| ... | |
| *if( asps_patch_constant_flag ){* | |
| *ath_num_patch_minus1* | ue(v) |
| *ath_num_patch_in_height_minus1* | ue(v) |
| *ath_patch_size_x_minus1* | ue(v) |
| *ath_patch_size_y_minus1* | ue(v) |
| *ath_patch_mode* | ue(v) |
| *ath_patch_equal_3d_offset_d_flag* | u(1) |
| *}* | |
| ... | |
| byte_alignment( ) | |
| } | | where the new semantics may be defined as:

ath_num_patch_minus1 specifies the number of patches in current atlas tiles. It specifies the number of texture and opacity layers for the MPI representation.

ath_num_patch_in_height_minus1 plus 1 specifies the number of patches in height.

ath_patch_size_x_minus1 plus 1 specifies the quantized width value of the patches.

ath_patch_size_y_minus1 plus 1 specifies the quantized height value of the patches.

When a single tile exists in an atlas frame, then.

num_patch_in_width =

$\quad$ (ath_num_patch_minus1 + 1)/(ath_num_patch_in_height_minus1 + 1)

ath_patch_size_x_minus1 = $\qquad\qquad\qquad\qquad\qquad$ 5

$\quad$ asps_frame_width/(num_patch_in_width $* PatchSizeXQuantizer$) − 1 ath_patch_size_y_minus1 = asps_frame_height/

$\quad$ ((ath_num_patch_in_height_minus1 + 1) $* PatchSizeYQuantizer$) − 1 $\;$ 10 ath_patch_mode indicates the patch mode for patches.
ath_patch_equal_3d_offset_d_flag equal to 1 indicates
$\quad$ that equal distances are used to generate patches and
$\quad$ depth parameters for each patch. $\qquad$ 15
For atlas_tile_data_unit( )

|  | Descriptor |
|---|---|
| atlas_tile_data_unit( tileID ) {<br>  if( ath_type == SKIP_TILE ) {<br>    for( p = 0; p < RefAtduTotalNumPatches[ tileID ]; p++ )<br>      skip_patch_data_unit( )<br>  } else {<br>    p = 0<br>    *if( asps_patch_constant_flag ){*<br>      *for( p = 0; p <= ath_num_patch_minus1; p++ )*<br>        *if( !ath_patch_equal_3d_offset_d_flag)*<br>          **pdu_3d_offset_d[*tileID*][*p* ]** | ue(v) |
|     *}else{*<br>      do {<br>        atdu_patch_mode[tileID ][p ] | ue(v) |
|     isEnd = ( ath_type == P_TILE && atdu_patch_mode[ tileID ][ p ] == P_END) ‖<br>    ( ath_type == I_TILE && atdu_patch_mode[ tileID ][ p ] == I_END )<br>        if( !isEnd ) {<br>          patch_information_data( tileID , p , atdu_patch_mode[ tileID ][ p ] )<br>          p++<br>        }<br>      } while( !isEnd )<br>    }<br>  }<br>  AtduTotalNumPatches[ tileID ] = p<br>} |  | where the new semantic may be defined as:
pdu_3d_offset_d[tileID][p] specifies the shift to be
$\quad$ applied to the reconstructed patch points in patch with
$\quad$ index p of the current atlas tile, with tile ID equal to $\;$45
$\quad$ tileID, along the normal axis.
When asps_patch_constant_flag is equal to 1, no
patch_information_data structure is present in atlas_
tile_data_unit (tileID) and similar information can be
derived by using information in the atlas tile header, for
example, as described in:

```
for (patchIdx = 0 ; patchIdx <= ath_num_patch _minus1 ; patchIdx++) {
   atdu_patch_mode[ tileID ][ patchIdx ] = ath_patch_mode
      pdu_2d_pos_x[ tileID ][ patchIdx ] = ath_patch_size_x_minus1
*
   (patchIdx
%((ath_num_patch_minus1+1)/(ath_num_patch_in_height_minus1+1)))
   pdu_2d_pos_y[ tileID ][ patchIdx ] =
      ath_patch_size_y_minus1 * (patchIdx
/(ath_num_patch_in_height_minus1 +1))
   pdu_2d_size_x_minus1[ tileID ][ patchIdx ] =
ath_patch_size_x_minus1   pdu_2d_size_y_minus1[ tileID ][ patchIdx ] =
ath_patch_size_y_minus1   pdu_3d_offset_u[ tileID ][ patchIdx ] = 0
   pdu_3d_offset_v[ tileID ][ patchIdx ] = 0
   pdu_projection_id[ tileID ][ patchIdx ] = 0
   pdu_orientation_index[ tileID ][ patchIdx ] = 0
}
```

When pdu_3d_offset_d[tileID][p] is not present in atlas_tile_data_unit (tileID), then:

```
for (patchIdx=0; patchIdx<=ath num patch minus1;
    patchIdx++)                    pdu_3d_offset_d[tileID]
    [patchIdx]=patchIdx
```

Support of Temporal Interleaved Packing in V3C Specification

V3C supports spatial domain packing (e.g., side-by-side or top-and-bottom) of attributes via the V3C packed video extension. However, temporal interleaved packing is not supported. In an example embodiment, one can add two new flags in Section 8.3.4.7, "Packing information syntax" to add such support in the specification, as shown in Table 17 below. Proposed additions are depicted in an Italic font.

As depicted in Table 17, in an example embodiment, first, the syntax checks using a first flag (e.g., pin_attribute_same_dimension_flag) if the dimensions of attributes to be packed are the same. If the dimensions are not same, it does not allow temporal-interleave packing because in that case only VVC RPR can support this type of single stream video, otherwise it reads a second flag (e.g., pin_attribute_temporal_interleave_flag) to check whether temporal interleaving is enabled or not. At the same time, in an example embodiment, the syntax allows for pin_region_xxx information (like. position (x,y) coordinates, width, and height) to be skipped, thus saving 64 bits.

TABLE 17

Example of modified "Packing information syntax"
Table in V3C specification (Section 8.3.4.7)

| | Descriptor |
|---|---|
| packing_information( j ) { | |
|   pin_codec_id[j ] | u(8) |
|   pin_occupancy_present_flag[j ] | u(1) |
|   pin_geometry_present_flag[j ] | u(1) |
|   pin_attribute_present_flag[j ] | u(1) |
|   if( pin_occupancy_present_flag[ j ] ) { | |
|     pin_occupancy_2d_bit_depth_minus1[j ] | u(5) |
|     pin_occupancy_msb_align_flag[j ] | u(1) |
|     pin_lossy_occupancy_compression_threshold[j ] | u(8) |
|   } | |
|   if( pin_geometry_present_flag[ j ] ) { | |
|     pin_geometry_2d_bit_depth_minus1[j ] | u(5) |
|     pin_geometry_msb_align_flag[j ] | u(1) |
|     pin_geometry_3d_coordinates_bit_depth_minus1[j ] | u(5) |
|   } | |
|   if( pin_attribute_present_flag[ j ] ) { | |
|     pin_attribute_count[j ] | u(7) |
|     *if (pin_attribute_count[ j ] > 1) {* | |
|       *pin_attribute_same_dimension_flag[j ]* | u(1) |
|       *if (pin_attribute_same_dimension_flag[ j ] == 1)* | |
|         *pin_attribute_temporal_interleave_flag[j ]* | u(1) |
|     *}* | |
|     for( i = 0; i < pin_attribute_count[ j ]; i++ ) { | |
|       pin_attribute_type_id[j ][i ] | u(4) |
|       pin_attribute_2d_bit_depth_minus1[j ][i ] | u(5) |
|       pin_attribute_msb_align_flag[j ][i ] | u(1) |
| pin_attribute_map_absolute_coding_persistence_flag[j ][i ] | u(1) |
|       d = pin_attribute_dimension_minus1[ j ][ i ] | u(6) |
|       if( d == 0 ) { | |
|         pin_attribute_dimension_partitions_minus1[ j ][ i ] = 0 | |
|         m = 0 | |
|       } else | |
|         m = pin_attribute_dimension_partitions_minus1[ j ][ i ] | u(6) |
|       for( k = 0; k < m; k++ ) { | |
|         if( k + d == m ) { | |
|           pin_attribute_partition_channels_minus1[ j ][ i ][ k ] = 0 | |
|           n = 0 | |
|         } else | |
|           n = pin_attribute_partition_channels_minus1[ j ][ i ][ k ] | ue(v) |
|         d -= n + 1 | |
|       } | |
|       pin_attribute_partition_channels_minus1[ j ][ i ][ m ] = d | |
|     } | |
|   } | |
|   pin_regions_count_minus1[j ] | ue(v) |
|   for( i = 0; i <= pin_regions_count_minus1[ j ]; i++ ) { | |
|     pin_region_tile_id[j ][i ] | u(8) |
|     pin_region_type_id_minus2[j ][i ] | u(2) |
|     *if (!pin_attribute_temporal_interleave_flag[ j ]) {* | |
|       pin_region_top_left_x[j ][i ] | u(16) |
|       pin_region_top_left_y[j ][i ] | u(16) |
|       pin_region_width_minus1[j ][i ] | u(16) |
|       pin_region_height_minus1[j ][i ] | u(16) |
|     *}* | |
|     pin_region_unpack_top_left_x[j ][i ] | u(16) |
|     pin_region_unpack_top_left_y[j ][i ] | u(16) |
|     pin_region_rotation_flag[j ][i ] | u(1) |

TABLE 17-continued

Example of modified "Packing information syntax"
Table in V3C specification (Section 8.3.4.7)

| | Descriptor |
|---|---|
| if( pin_region_type_id_minus2[ j ][ i ] + 2 == V3C_AVD || | |
|   pin_region_type_id_minus2[ j ][ i] + 2 == V3C_GVD ) { | |
|     pin_region_map_index[j ][i ] | u(4) |
|     pin_region_auxiliary_data_flag[j ][i ] | u(1) |
|   } | |
| if( pin_region_type_id_minus2[ j ][ i ] + 2 == V3C_AVD ) { | |
|     pin_region_attr_index[j ][i ] | u(7) |
|     k = pin_region_attr_index[ j ][ i ] | |
|     if( pin_attribute_dimension_minus1[ j ][ k ] > 0 ) | |
|       pin_region_attr_partition_index[j ][i ] | u(5) |
|   } | |
|  } | |
| } | |

New Proposed Syntax Elements pin_attribute_same_dimension_flag[j] equal to 1 indicates that the attributes present in packed video frames for the atlas with atlas ID j have same spatial dimension.

pin_attribute_temporal_interleave_flag[j] equal to 1 indicates that the attributes present in packed video frames are packed in a temporal interleaved fashion.

As depicted, if the attributes have the same dimensions and use temporal interleaved packing (that is, pin_attribute_temporal_interleave_flag[j]=1), then one may skip the signaling of the location relative to (0, 0) and size (width and height).

MPI Transmission with Scalable Codec

In an embodiment, scalable video coding (e.g., SVC, SHVC, and the like) can be used for MPI video transmission. For example, the base coding layer could be the conventional 2D picture from a source camera and the enhancement layer could contain the packed MPI layers and the MPI metadata associated with them. The level-constraints would also apply only to those coding layers. Alternatively, there could be multiple enhancement layers, each one corresponding to a specific MPI layer.

MPI Reconstruction with Partial Accessing of the Layers

In another embodiment, MPI rendering can use only a subset of the layers that are needed for partial decoding/access of the coded layers in a packed picture. For example, rendering only the background may just need a subset of layers containing information of the background. Alternatively, rendering the foreground without the background may just need a subset of layers containing information of the foreground. Then:

$$C^s = \sum_i C_i^s W_i^s, i \text{ is the index of selected layers from 0 to } D-1. \quad (11)$$

In such cases, a decoder may just decode a partial bitstream corresponding to the subset of layers and perform the rendering. To support the partial decoding, tile/slice and/or subpicture coding features of the conventional 2D video coding may need to be enabled. Also, the decoder can decode and render a "view port" which corresponds to a subarea of the original full image dimension, by properly exercising the tile/slice/subpicture features. From the MPI information metadata stream, the decoder should understand which spatial regions in the frame correspond to the selected layers so it can decode the bitstream of the regions.

Example Hardware

Figure 17:
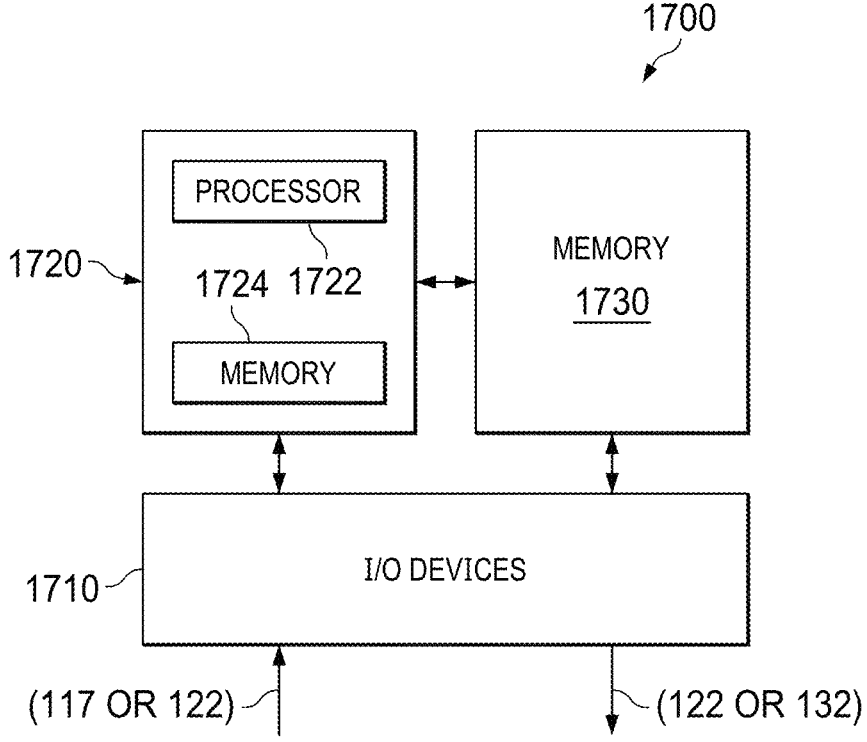
FIG. 17 is a block diagram illustrating a computing device according to an embodiment.

FIG. 17 is a block diagram illustrating a computing device (1700) according to an embodiment. The device (1700) can be used, e.g., at the coding block (120) or the decoding block (130). The device (1700) comprises input/output (I/O) devices (1710), a processing engine (1720), and a memory (1730). The I/O devices (1710) may be used to enable the device (1700) to receive at least a portion of the data stream (117 or 122) and to output at least a portion of the data stream (122 or 132).

The memory (1730) may have buffers to receive various above-described inputs, e.g., by way of the corresponding data stream(s). Once the inputs are received, the memory (1730) may provide portions various thereof to the processing engine (1720) for processing therein. The processing engine (1720) includes a processor (1722) and a memory (1724). The memory (1724) may store therein program code, which when executed by the processor (1722) enables the processing engine (1720) to perform various coding, decoding, image-processing, and metadata operations described above. The program code may include, inter alia, the program code embodying the various methods described above.

According to an example embodiment disclosed above, e.g., in the summary section and/or in reference to any one or any combination of some or all of FIGS. 1-17, provided is an apparatus for encoding a sequence of multiplane images, the apparatus comprising: at least one processor; and at least one memory including program code, wherein the at least one memory and the program code are configured to, with the at least one processor, cause the apparatus at least to: generate a sequence of video frames, each of the video frames including a respective plurality of tiles representing layers of respective one or more of the multiplane images; generate a metadata bitstream to specify at least a packing arrangement of the tiles in the sequence of video frames; generate a video bitstream by applying video compression to the sequence of video frames; and multiplex the video bitstream and the metadata bitstream for transmission. Herein, the term "tiles" refers to portions of the image frame that are not necessarily limited to the shapes and/or sizes specified in the HEVC specification and are not limited to being integer multiples of the CTU.

In some embodiments of the above apparatus, a first frame of the sequence of video frames has tiles corresponding to a first multiplane image; and a second frame of the sequence of video frames has tiles corresponding to a second multiplane image.

In some embodiments of any of the above apparatus, the first and second multiplane images are images of a scene from different respective camera positions.

In some embodiments of any of the above apparatus, the first and second multiplane images are images of a scene at different respective times.

In some embodiments of any of the above apparatus, a frame of the sequence of video frames has: a first set of tiles representing texture layers of a first multiplane image; and a second set of tiles representing alpha layers of the first multiplane image.

In some embodiments of any of the above apparatus, the first and second sets of tiles have different respective numbers of tiles.

In some embodiments of any of the above apparatus, a frame of the sequence of video frames has: a first set of tiles representing a first multiplane image; and a second set of tiles representing a second multiplane image.

In some embodiments of any of the above apparatus, the first and second multiplane images are images of a scene from different respective camera positions.

In some embodiments of any of the above apparatus, the first set of tiles includes a tile representing a texture layer of the first multiplane image and another tile representing an alpha layer of the first multiplane image; and wherein the second set of tiles includes a tile representing a texture layer of the second multiplane image and another tile representing an alpha layer of the second multiplane image.

In some embodiments of any of the above apparatus, the frame of the sequence of video frames further has: a third set of tiles representing a third multiplane image; and a fourth set of tiles representing a fourth multiplane image.

In some embodiments of any of the above apparatus, the metadata bitstream includes a supplemental enhancement information message. In some embodiments of any of the above apparatus, a frame of the sequence of video frames has a tile representing a reference image.

In some embodiments of any of the above apparatus, the metadata bitstream includes parameters selected from the group consisting of: a size of a reference view; a number of layers in the multiplane images; a number of simultaneous views; one or more characteristics of the packing arrangement; layer merging information; dynamic range adjustment information for a texture channel or for an alpha channel; and reference view information.

According to another example embodiment disclosed above, e.g., in the summary section and/or in reference to any one or any combination of some or all of FIGS. 1-17, provided is a method for encoding a sequence of multiplane images, the method comprising: generating a sequence of video frames, each of the video frames including a respective plurality of tiles representing layers of one or more of the multiplane images; generating a metadata bitstream to specify at least a packing arrangement of the tiles in the sequence of video frames; generating a video bitstream by applying video compression to the sequence of video frames; and multiplexing the video bitstream and the metadata bitstream for transmission.

For some embodiments of the above method, provided is a non-transitory computer-readable medium storing instructions that, when executed by at least one processor, cause the at least one processor to perform operations comprising the above method for encoding a sequence of multiplane images.

According to yet another example embodiment disclosed above, e.g., in the summary section and/or in reference to any one or any combination of some or all of FIGS. 1-17, provided is an apparatus for decoding a received bitstream having encoded therein a sequence of multiplane images, the apparatus comprising: at least one processor; and at least one memory including program code, wherein the at least one memory and the program code are configured to, with the at least one processor, cause the apparatus at least to: demultiplex the received bitstream to obtain a video bitstream having encoded therein a sequence of video frames and to obtain a metadata bitstream specifying at least a packing arrangement of tiles in the sequence of video frames, the tiles representing layers of the multiplane images; reconstruct the sequence of video frames by applying video decompression to the video bitstream; and reconstruct the sequence of multiplane images using the tiles from the sequence of video frames and based on the metadata bitstream.

In some embodiments of the above apparatus, the at least one memory and the program code are configured to, with the at least one processor, further cause the apparatus to generate a sequence of viewable images by rendering the sequence of multiplane images.

In some embodiments of any of the above apparatus, rendering operations directed at generating a composite viewable image corresponding to a novel view include: applying warping to layers of a set of the multiplane images corresponding to different respective reference camera positions, the warping being performed according to the novel view; compositing the layers of the set of the multiplane images after the warping to generate a corresponding set of individual viewable images corresponding to the novel view; and generating the composite viewable image as a weighted sum of the individual viewable images.

In some embodiments of any of the above apparatus, the set of the multiplane images includes one, two, three, or four multiplane images. In some other embodiments, the set of the multiplane images includes more than four multiplane images.

In some embodiments of any of the above apparatus, a first frame of the sequence of video frames has tiles corresponding to a first multiplane image; and wherein a second frame of the sequence of video frames has tiles corresponding to a second multiplane image.

In some embodiments of any of the above apparatus, the first and second multiplane images are images of a scene from different respective camera positions.

In some embodiments of any of the above apparatus, the first and second multiplane images are images of a scene at different respective times.

In some embodiments of any of the above apparatus, a frame of the sequence of video frames has: a first set of tiles representing texture layers of a first multiplane image; and a second set of tiles representing alpha layers of the first multiplane image.

In some embodiments of any of the above apparatus, the first and second sets of tiles have different respective numbers of tiles.

In some embodiments of any of the above apparatus, a frame of the sequence of video frames has: a first set of tiles representing a first multiplane image; and a second set of tiles representing a second multiplane image.

In some embodiments of any of the above apparatus, the first and second multiplane images are images of a scene from different respective camera positions.

In some embodiments of any of the above apparatus, the first set of tiles includes a tile representing a texture layer of the first multiplane image and another tile representing an alpha layer of the first multiplane image; and wherein the second set of tiles includes a tile representing a texture layer of the second multiplane image and another tile representing an alpha layer of the second multiplane image.

In some embodiments of any of the above apparatus, the frame of the sequence of video frames further has: a third set of tiles representing a third multiplane image; and a fourth set of tiles representing a fourth multiplane image.

In some embodiments of any of the above apparatus, the metadata bitstream includes a supplemental enhancement information message. In some embodiments of any of the above apparatus, a frame of the sequence of video frames has a tile representing a reference image.

In some embodiments of any of the above apparatus, the metadata bitstream includes parameters selected from the group consisting of: a size of a reference view; a number of layers in the multiplane images; a number of simultaneous views; one or more characteristics of the packing arrangement; layer merging information; dynamic range adjustment information for a texture channel or for an alpha channel; and reference view information.

According to yet another example embodiment disclosed above, e.g., in the summary section and/or in reference to any one or any combination of some or all of FIGS. 1-17, provided is a method for decoding a received bitstream having encoded therein a sequence of multiplane images, the method comprising: demultiplexing the received bitstream to obtain a video bitstream having encoded therein a sequence of video frames and to obtain a metadata bitstream specifying at least a packing arrangement of tiles in the sequence of video frames, the tiles representing layers of the multiplane images; reconstructing the sequence of video frames by applying video decompression to the video bitstream; and reconstructing the sequence of multiplane images using the tiles from the sequence of video frames and based on the metadata bitstream.

For some embodiments of the above method, provided is a non-transitory computer-readable medium storing instructions that, when executed by at least one processor, cause the at least one processor to perform operations comprising the above method for decoding a received bitstream.

According to yet another example embodiment disclosed above, e.g., in the summary section and/or in reference to any one or any combination of some or all of FIGS. 1-17, provided is a method for decoding a plurality of received bitstreams, each having encoded therein a respective sequence of multiplane images corresponding to a different respective camera position, the method comprising: demultiplexing a first received bitstream to obtain a first video bitstream having encoded therein a first sequence of video frames and to obtain a first metadata bitstream specifying at least a first packing arrangement of tiles in the first sequence of video frames, the tiles representing layers of first multiplane images corresponding to a first camera position; reconstructing the first sequence of video frames by applying video decompression to the first video bitstream; reconstructing a first sequence of multiplane images using the tiles from the first sequence of video frames and based on the first metadata bitstream; demultiplexing a second received bitstream to obtain a second video bitstream having encoded therein a second sequence of video frames and to obtain a second metadata bitstream specifying at least a second packing arrangement of tiles in the second sequence of video frames, said tiles representing layers of second multiplane images corresponding to a second camera position; reconstructing the second sequence of video frames by applying video decompression to the second video bitstream; reconstructing a second sequence of multiplane images using the tiles from the second sequence of video frames and based on the second metadata bitstream; and generating a sequence of viewable images by rendering a set of multiplane images including at least one image from the first sequence of multiplane images and at least one image from the second sequence of multiplane images.

According to yet another example embodiment disclosed above, e.g., in the summary section and/or in reference to any one or any combination of some or all of FIGS. 1-17, provided is a method for decoding a bitstream, the method comprising: receiving a coded bitstream comprising a sequence of multiplane images and metadata comprising profile parameters to decode the coded bitstream according to an MPEG Immersive video (MIV) packed profile; and decoding the coded bitstream according to the metadata, wherein the metadata comprise: a vps_attribute_video_present_flag[atlasID] set to 0; a pin_attribute_present_flag[atlasID] set to 1; a pin_attribute_count[atalasID] set to 2; a pin_attribute_type_id[atlasID][attrIdx] set to ATTR_TEXTURE, ATTR_TRANSPARENCY; and a vps_packed_video_present_flag[atlasID] set to 1, wherein vps_attribute_video_present_flag[j] indicates whether an atlas with atlas ID j has or not attribute video data associated with it, pin_attribute_present_flag[j] indicates whether packed video frames of the atlas with atlas ID j contain or not regions with attribute data, pin_attribute_count[j] indicates the number of attributes with unique attribute types present in packed video frames for the atlas with atlas ID j, pin_attribute_type_id[j][i] indicates the attribute type of the attribute with attribute with index i, for the atlas with atlas ID j, and vps_packed_video_present_flag[j] indicates whether the atlas with atlas ID j has or not packed video data associated with it.

In embodiments of the above method, the MIV metadata further comprise a flag to indicate whether patch mode, patch width, and patch height apply to all patches in an atlas sequence.

According to yet another example embodiment disclosed herein, e.g., in the summary section and/or in reference to any one or any combination of some or all of FIGS. 1-17, provided is a method to process a volumetric bitstream, the method comprising: receiving a coded bitstream comprising volumetric data and metadata comprising packing information syntax to decode the coded data according to a visual volumetric video-based coding (V3C) specification, wherein the metadata comprise: a first flag to check if dimensions of attributes to be packed are the same; a second flag to check if temporal interleaving is enabled or not; and if the dimensions of attributes to be packed are the same and temporal interleaving is enabled, then decoding the volumetric data using temporal interleaving.

In some embodiments of any of the above apparatus, the metadata bitstream may comprise one or more of: a first syntax element (mpi_num_layers_minus1) used to determine a total number of MPI layers; a second syntax element (mpi_layer_depth_or_disparity values_flag) signaling whether depth information is interpreted as depth values or disparity values; a third syntax element (mpi_layer_depth_equal_distance_flag) signaling whether the depth information values have equal distance in depth or equal values in disparity; a fourth syntax element (mpi_texture_opacity_interleave flag) signalling whether decoded output pictures correspond to temporally interleaved texture and opacity constituent pictures in output order or to spatially packed texture and opacity constituent pictures; and if the fourth syntax element indicates spatially packed pictures, then a fifth syntax element (mpi_texture_opacity_arrangement_flag) indicates a top-bottom or side-by-side arrangement, and a sixth syntax element indicates a number of spatially packed layers in height for picture 0 and picture 1.

In some embodiments of the above apparatus, if the third syntax element signals the depth information values have equal distance, then a processor: reads a seventh syntax element (mpi_depth_equal_distance_type_flag) signalling whether depth values have equal distance in depth or disparity; and reads depth information for a nearest depth (ZNear) and a farthest depth (ZFar) or a nearest disparity (DNear) or a farthest disparity (DFar), wherein the depth information is applicable to all the MPI layers; else, for each of the MPI layers: reads depth information for a nearest depth (ZNear) and a farthest depth (ZFar) or a nearest disparity (DNear) or a farthest disparity (DFar).

In some embodiments of the above apparatus:
if mpi_layer_depth_or_disparity values_flag is equal to 0 and mpi_depth_equal_distance_type_flag is equal to 0, then depth value $Z[\text{mpi\_num\_layers\_minus}1-i]=$
$i*(\text{ZFar}-\text{ZNear})\div(\text{mpi\_num\_layers\_minus}1)+\text{ZNear}$, and disparity value $D[i]=1\div Z[i]$; if mpi_layer_depth_or_disparity values_flag is equal to 0 and mpi_depth_equal_distance_type_flag is equal to 1, then the depth value $Z[i]=$
$1\div(i*(1\div\text{ZNear}-1\div\text{ZFar})\div(\text{mpi\_num\_layers\_minus}1)+1\div\text{ZFar})$, and the disparity value $D[i]=1\div Z[i]$; if mpi_layer_depth_or_disparity values_flag is equal to 1 and mpi_depth_equal_distance_type_flag is equal to 0, then the disparity value $D[\text{mpi\_num\_layers\_minus}1-i]=1\div(i*(1\div\text{DFar}-1\div\text{DNear})\div(\text{mpi\_num\_layers\_minus}1)+1\div\text{DNear})$, and the depth value $Z[i]=1\div D[i]$; and if mpi_layer_depth_or_disparity values_flag is equal to 1 and mpi_depth_equal_distance_type_flag is equal to 1, then the disparity value $D[i]=i*(\text{DNear DFar})$: $(\text{mpi\_num\_layers\_minus}1)\infty\text{DFar}$, and the depth value $Z[i]=1\div D[i]$, wherein mpi_layer_depth_or_disparity values_flag denotes the second syntax element, mpi_depth_equal_distance_type_flag denotes the fourth syntax element, and mpi_num_layers_minus1 denotes the first syntax element.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A method for decoding a bitstream, the method comprising:

receiving a coded bitstream comprising a sequence of multiplane images and metadata comprising profile parameters to decode the coded bitstream according to an MPEG Immersive video (MIV) packed profile; and decoding the coded bitstream according to the metadata, wherein the metadata indicate:

using a single decoder;

presence of packed video containing texture and transparency without occupancy and geometry;

a single MPI view; and a single atlas with a single tile.

2. The method of claim 1, wherein the metadata further indicate that there is only one patch per MPI layer, and a layer patch has width and height equal to a width and a height of a camera projection plane.

3. The method of claim 1, wherein indicating using a single decoder comprises setting ptl_max_decodes_idc=0.

4. The method of claim 1, wherein indicating the presence of packed video containing texture and transparency, without occupancy and geometry, comprises setting:

vps_packed_video_present_flag[atlasID]=1;

pin_attribute_present_flag[atlasID]=1;

pin_attribute_count[atlasID]=2;

pin_attribute_type_id[atlasID][0]=ATTR_TEXTURE;

pin_attribute_type_id[atlasID][1]=ATTR_TRANSPARENCY;

vps_occupancy_video_present_flag[atlasID]=0;

pin_occupancy_present_flag[atlasID]=0;

vme_embedded_occupancy_enabled_flag=0;

vps_geometry_video_present_flag[atlasID]=0; and pin_geometry_present_flag[atlasID]=0.

5. The method of claim 1, further indicating disabling scaling of geometry and occupancy by setting:

vme_geometry_scale_enabled_flag=0;

vme_occupancy_scale_enabled_flag=0; and asme_occupancy_scale_enabled_flag=0.

6. The method of claim 1, wherein indicating a single MPI view comprises setting mvp_num_views_minus1=0.

7. The method of claim 1, wherein indicating a single atlas with a single tile comprises setting:

vps_atlas_count_minus1[atlasID]=0 for indicating a single atlas;

gm_group_count=1 for indicating a single group; and afti_single_tile_in_atlas_frame_flag=1 for indicating a single atlas with a single tile.

8. The method of claim 3, wherein patch width and height information is signaled as:

AtlasPatch2dSizeX[p]=ci_projection_plane_width_minus1[v]+1; and

AtlasPatch2DsizeY[p]=ci_projection_plane_height_minus1[v]+1, wherein p denotes a patch index and v denotes a view identifier.

9. The method of claim 3, wherein indicating all patches are generated for a single MPI camera view comprises setting:

pdu_projection_id[tileID][p]=mvp_view_id[v], wherein p denotes a patch index and v denotes a view identifier.

10. The method of claim 3, wherein indicating that a single patch is used per layer comprises setting Pdu3dOffsetD[tileID][p]!=Pdu3dOffsetD[tileID][q]    for all p!=q, wherein p denotes a patch index and v denotes a view identifier.

11. The method of claim 1, wherein the metadata further indicate that only intra atlas tile and intra patch are being used.

12. A non-transitory computer-readable-medium storing instructions that, when executed by a processor of a computer system, cause the computer system to perform operations comprising the method according claim 1.

13. An apparatus comprising a processor and configured to perform the method recited in claim 1.

* * * * *